US008846965B2

(12) United States Patent
Ookubo et al.

(10) Patent No.: US 8,846,965 B2
(45) Date of Patent: Sep. 30, 2014

(54) TONER FOR ELECTROPHOTOGRAPHY AND METAL-CONTAINING COMPOUND

(75) Inventors: Kimihiko Ookubo, Hachioji (JP); Keiko Ishidai, Hachioji (JP); Issei Nakahara, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 170 days.

(21) Appl. No.: 13/383,899

(22) PCT Filed: Jun. 4, 2010

(86) PCT No.: PCT/JP2010/059517
§ 371 (c)(1), (2), (4) Date: Jan. 13, 2012

(87) PCT Pub. No.: WO2011/010509
PCT Pub. Date: Jan. 27, 2011

(65) Prior Publication Data

US 2012/0116110 A1 May 10, 2012

(30) Foreign Application Priority Data

Jul. 22, 2009 (JP) ................................ 2009-171025

(51) Int. Cl.
*C07F 1/08* (2006.01)
*G03G 9/00* (2006.01)
*G03G 9/097* (2006.01)

(52) U.S. Cl.
CPC .................................. *G03G 9/09783* (2013.01)
USPC .......................................... 556/40; 430/108.3

(58) Field of Classification Search
USPC ............................................................ 556/40
See application file for complete search history.

(56) References Cited

U.S. PATENT DOCUMENTS

2006/0292472 A1 12/2006 Ono et al.
2007/0092819 A1 4/2007 Daifuku et al.
2007/0259282 A1 11/2007 Ishidai et al.

FOREIGN PATENT DOCUMENTS

JP 03-276161 A 12/1991
JP 10-020559 A 1/1998
JP 2004-302066 A 10/2004
JP 2007-034264 A 2/2007
JP 2008-170772 A 7/2008
JP 2009-036811 A 2/2009
WO 2008/023657 A1 2/2008

OTHER PUBLICATIONS

International Search Report for International Application No. PCT/JP2010/059517 mailed Aug. 10, 2010 with English translation.
Extended European Search Report for Application 10802130.4-1303/2458442; PCT/JP2010/059517, dated Nov. 27, 2013.

*Primary Examiner* — Porfirio Nazario Gonzalez
(74) *Attorney, Agent, or Firm* — Cantor Colburn LLP

(57) ABSTRACT

Disclosed is a toner for electrophotography, which has good hue, good light resistance and good electrostatic charge, and is capable of providing images that are free from white spots. The toner for electrophotography exhibits a good performance. Specifically disclosed is a toner for electrophotography, which is characterized by containing at least one metal-containing compound that is represented by general formula (1). (In the formula, R1 represents an alkyl group; R2 represents a hydrogen atom, an alkoxycarbonyl group, an aryloxycarbonyl group, a sulfamoyl group, a sulfinyl group, an alkylsulfonyl group, an arylsulfonyl group, an acyl group, a halogen atom or a cyano group; and R3 represents a group that has 9 or more carbon atoms and an aromatic hydrocarbon structure.)

Formula (1)

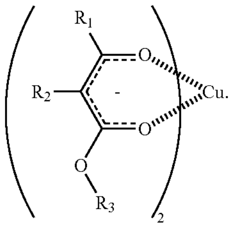

2 Claims, 2 Drawing Sheets

TONER FOR ELECTROPHOTOGRAPHY AND METAL-CONTAINING COMPOUND

CROSS REFERENCE TO RELATED APPLICATIONS

This is a U.S. national stage of application No. PCT/JP2010/059517, filed on Jun. 4, 2010 . Priority under 35 U.S.C. §119(a) and 35 U.S.C. §365 (b) is claimed from Japanese Application No. 2009-171025, filed Jul. 22, 2009, the disclosure of which is also incorporated herein by reference.

TECHNICAL FIELD

The present invention relates to an electrophotographic toner and a metal-containing compound, and more specifically, relates to an electrophotographic toner using a metal-containing compound which acts as a metal ion source.

BACKGROUND

As properties required for an electrophotographic toner used in an image formation apparatus, such as a color copier or a color printer using an electrophotography method, there are cited: color reproduction quality, transparency of an image and lightfastness. Widely used electrophotographic toners in the present time contain a pigment as a colorant which is dispersed in a particle. Since they use pigments, it is excellent in lightfastness. However, since the colorant is insoluble, it is likely to be aggregated to result in the problems of decrease of transparency and color shift of the transmitted color. Therefore, there are disclosed toners in which the colorant in the toners is changed from a pigment to a dye (for example, refer to Patent document 1). Although these toners are excellent in transparency and color shift, they have conversely a problem of lightfastness. Further, since commonly known general dyes have relatively low molecular weight, it will sublimate during the step of heat fixing, and they had the defects of causing: staining of a fixing roller surface and an inside of the printer, decrease of an image density; and a smear. In recent years, a toner which uses a metal complex as a colorant is disclosed in order to resolve such defects (for example, refer to Patent document 2). Although the above-mentioned toner containing the metal complex colorant was excellent in lightfastness, the solubility of the colorant was too low to produce a different reflectance after printing owing to aggregation of the colorant. Consequently, further improvement was desired.

These problems were greatly improved by employing an electrophotographic toner using a metal-containing compound (for example, refer to Patent document 3). The image acquired from this toner was excellent in color reproduction quality and lightfastness, and it was extremely good.

An electrophotographic toner is generally produced by the knead-pulverizing method of: melt-kneading a mixture of a binder resin and a pigment, and according to necessity, with a releasing agent such as a wax and a charge controlling agent; fine grinding the mixture; and further size classifying the particles.

The toner produced by the usual knead-pulverizing method has an amorphous shape with broad particle size distribution and have the problems of: low fluidity, low transferring property, requiring high fixing energy, uneven electric charging amount among toner particles, and low electric charging stability. Furthermore, the image quality of the image acquired from such toner was still to be improved.

On the other hand, in order to overcome the problems of the above-mentioned toner produced by the knead-pulverizing method, the production method of the toner by the polymerizing method is proposed. Since this method does not include the pulverizing step, it does not need a knead manufacturing process and a pulverizing step for production of that toner, as a result, its contribution to cost reductions achieved by energy saving, abbreviation of production time, and improvement in a product yield are large. Moreover, it is easy to achieve a sharp particle size distribution of the toner particles by the polymerizing method compared with the particle size distribution of the toner particles by the knead-pulverization method. In addition, it is easy to incorporate a wax inside of the toner particles, and the fluidity of the toner can be raised largely. Moreover, it is also easy to obtain spherical toner particles.

However, the toner produced by the polymerizing method has many problems which are not yet resolved. For example, even if the toner obtained by the above-mentioned method is washed at the time of production, a surfactant remains to toner particles. Therefore, when the toner is used or kept under high-temperature and high humidity or, the toner particles absorb moisture, electric charging rise dup property and electric charging stability will be decreased. As a result, there will be produced white spots on an image or a fog, and dot reproducing ability and fine-line reproducing ability will fall, and image quality will be deteriorated. In particular, white spots on an image or a fog appeared remarkably when a full color image was produced by laminating a plurality of toner images (for example, refer to Patent document 4).

From the background described above, it has been requested a toner which fully satisfies color reproduction quality and lightfastness, and excellent in water fastness and electric charging stability without white spots of an image.

PRIOR ART DOCUMENTS

Patent Documents

Patent document 1: Japanese Patent Application Publication (hereafter it is called as JP-A) No. 3-276161

Patent document 2: JP-A No. 10-20559

Patent document 3: JP-A No. 2007-34264

Patent document 4: JP-A No. 2004-302066

SUMMARY OF THE INVENTION

Problems to be Solved by the Invention

The present invention was achieved in view of the above-mentioned situation. An object of the present invention is to provide an electrophotographic toner which has an excellent hue, an excellent lightfastness and good electric charging property without producing white spots of an image, and also to provide a metal-containing compound which can achieve these good properties.

Means to Solve the Problems

The present inventors have repeated investigation to resolve the above-mentioned problems.

As a result, the present invention has been completed. It was confirmed that an electrophotographic toner of the present invention was obtained by incorporating a specific metal-containing compound in an electrophotographic toner in a stable dispersion state. The obtained toner exhibited a good hue, lightfastness, water fastness and electric charging stability, and the produced image with this toner has no white spots on the image. That is, the above-described object of the present invention can be achieved by the following composition.

1. An electrophotographic toner comprising at least one metal-containing compound represented by the following Formula (1).

Formula (1)

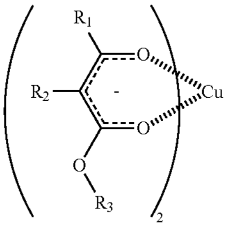

In Formula, $R_1$ represents an alkyl group; $R_2$ represents a hydrogen atom, an alkoxycarbonyl group, an aryloxycarbonyl group, a sulfamoyl group, a sulfininyl group, an alkylsulfonyl group, an arylsulfonyl group, an acyl group, a halogen atom, or a cyano group; and $R_3$ represents a group of 9 or more carbon atoms and having an aromatic hydrocarbon structure.

2. A metal-containing compound represented by the following Formula (1).

Formula (1)

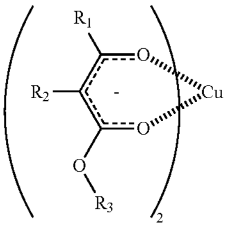

In Formula, $R_1$ represents an alkyl group; $R_2$ represents a hydrogen atom, an alkoxycarbonyl group, an aryloxycarbonyl group, a sulfamoyl group, a sulfinyl group, an alkylsulfonyl group, an arylsulfonyl group, an acyl group, a halogen atom, or a cyano group; and $R_3$ represents a group of 9 or more carbon atoms and having an aromatic hydrocarbon structure.

Effects of the Invention

It has been achieved to provide an electrophotographic toner which has an excellent hue, an excellent lightfastness and good electric charging property without producing white spots on an image formed with the toner by the present invention.

EMBODIMENT TO CARRY OUT THE INVENTION

Figure 1:
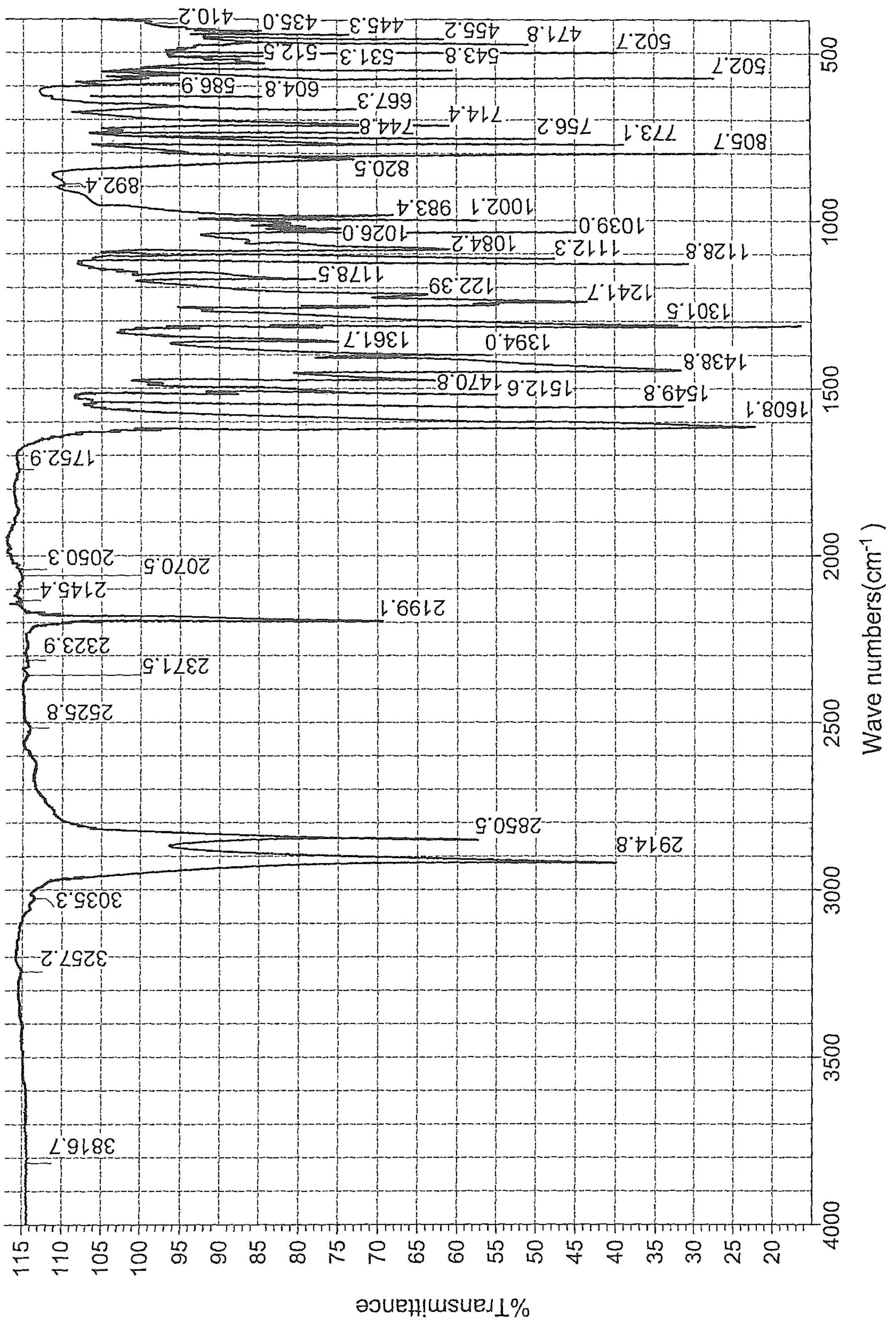
FIG. 1 shows an infra-red absorption spectrum of exemplified compound 8.

The present invention will be detailed below.

The structure represented by Formula (1) will be described.

<Compounds Represented by Formula (1)>

Formula (1) of the present invention can be described by the canonical Formulas (1a) and (1b). In the present invention, Formulas (1a) and (1b) are intrinsically identical, and they cannot be distinguished with each other. Here, discrimination of a covalent bond (shown by "–") and a coordinate bond (shown by ". . . ") are done for form's sake, they do not represent an absolute difference.

Formula (1a)

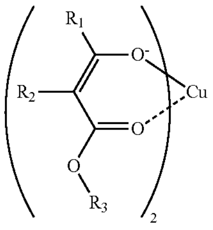

Formula (1b)

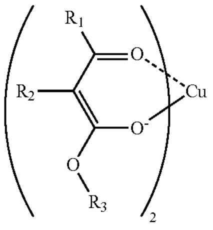

It is preferable that the metal-containing compounds of the present invention are obtained by synthesizing the compound represented by the following Formula (1-2) at first, then by allowing to react a bivalent metal compound with these compounds. The synthetic method of these metal-containing compounds can be referred to the method described in "Chelate chemistry (5): Complex Compound Chemistry Experimental Method [I](edited by Nankodo Publisher)". As a bivalent metal compound used, it can be cited: copper (II) chloride, copper (II) acetate and copper perchlorate. Moreover, the metal-containing compound used for the present invention may have a neutral ligand according to a central metal, and $H_2O$ or $NH_3$ are cited as a typical ligand.

Formula (1-2)

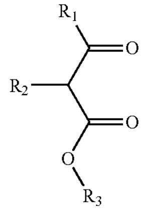

In Formula (1), Formula (1a), Formula (1b), Formula (1-2), $R_1$ represents an alkyl group (for example, a methyl group, an ethyl group, a propyl group, an isopropyl group, a tert-butyl group, a pentyl group, a hexyl group, an octyl group, a dodecyl group, a tridecyl group, a tetradecyl group, a pentadecyl group, a cyclopentyl group and a cyclohexyl group). These groups may further have a substituent.

Examples of a substituent which can substitute to $R_1$ include: an alkyl group (for example, a methyl group, an ethyl group, a propyl group, an isopropyl group, a tert-butyl group, a pentyl group, a hexyl group, an octyl group, a dodecyl group, a tridecyl group, a tetradecyl group, a pentadecyl group, a cyclopentyl group and a cyclohexyl group); an alkenyl group (for example, a vinyl group and an allyl group); an alkynyl group (for example, an ethynyl group and a propargyl group); an aryl group (for example, a phenyl group and a naphthyl group); a hetero aryl group (for example, a furyl group, a thienyl group, a pyridyl group, a pyridazinyl group, a pyrimidinyl group, a pyrazyl group, a triazyl group, an imidazolyl group, a pyrazolyl group, a thiazolyl group, a benzoimidazolyl group, a benzoxazolyl group, a quinazolinyl group and a phthalazinyl group); a heterocyclic group (for example, a pyrrolidyl group, an imidazolidyl group, a morpholyl group and an oxazolidyl group); an alkoxyl group (for example, a methoxy group, an ethoxy group, a propyloxy group, a pentyloxy group, an hexyloxy group, an octyloxy group, a dodecyloxy group, a cyclopentyloxy group and a cyclohexyloxy group); an aryloxy group (for example, a phenoxy group and a naphthyloxy group); an alkylthio group (for example, a methylthio group, an ethylthio group, a propylthio group, a pentylthio group, a hexylthio group, an octylthio group, and a dodecylthio group, a cyclopentylthio group and a cyclohexylthio group); an arylthio group (for example, a phenylthio group and a naphthylthio group); an alkoxycarbonyl group (for example, a methyloxycarbonyl group, an ethyloxycarbonyl group, a butyloxycarbonyl group, an octyloxycarbonyl group and a dodecyloxycarbonyl group); an aryloxycarbonyl group (for example, a phenyloxycarbonyl group and a naphthyloxycarbonyl group); a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group); an acyl group (for example, an acetyl group, an ethylcarbonyl group, a propylcarbonyl group, a pentylcarbonyl group, a cyclohexylcarbonyl group, an octylcarbonyl group, a 2-ethylhexylcarbonyl group, a dodecylcarbonyl group, a phenylcarbonyl group, a naphthylcarbonyl group and a pyridylcarbonyl group); an acyloxy group (for example, an acetyloxy group, an ethylcarbonyloxy group, a butylcarbonyloxy group, an octylcarbonyloxy group, a dodecylcarbonyloxy group and a phenylcarbonyloxy group); an amido group (for example, a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group and a naphthylcarbonylamino group); a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group and a 2-pyridylaminocarbonyl group); a ureido group (for example, a methylureido group, an ethylureido group, a pentylureido group, a cyclohexylureido group, an octylureido group, a dodecylureido group, a phenylureido group, a naphthylureido group and a 2-oyridylaminoureido group); a sulfinyl group (for example, a methylsulfinyl group, an ethylsulfinyl group, a butylsulfinyl group, a cyclohexylsulfinyl group, a 2-ethylhexylsulfinyl group, a dodecylsulfinyl group, a phenylsulfinyl group, a naphthylsulfinyl group and a 2-pyridylsulfinyl group); an alkylsulfonyl group (for example, a methylsulfonyl group, an ethylsulfonyl group, a butylsulfinyl group, a cyclohexylsulfonyl group, a 2-ethylhexylsulfonyl group and a dodecylsulfonyl group); an amino group (for example, an amino group, an ethylamino group, a dimethylamino group, a butylamino group, a cyclopentylamino group, a dodecylamino group, an anilino group, a naphthylamino group and a 2-pyridylamino group); a cyano group; a nitro group; and a halogen atom (for example, a chlorine atom, a bromine atom, a fluorine atom and an iodine atom). These substituents may be further substituted by the above-mentioned substituent.

A preferable $R_1$ is an alkyl group of 1 to 4 carbon atoms, it is preferable to be a straight chain structure, more preferably, it is a methyl group or an ethyl group, and still more preferably, it is a methyl group.

$R_2$ represents a hydrogen atom, an alkoxycarbonyl group, an aryloxycarbonyl group, a sulfamoyl group, a sulfinyl group, an alkylsulfonyl group, an arylsulfonyl group, an acyl group, a halogen atom, or a cyano group. As specific examples of these groups, there are cited the synonymous groups among the substituents which can substitute to $R_1$.

A preferable $R_2$ is an alkoxycarbonyl group, an alkylsulfonyl group, an arylsulfonyl group, an acyl group, or a cyano group. More preferably, it is an alkoxycarbonyl group, an acyl group, or a cyano group. Still more preferably, it is a cyano group.

$R_3$ represents a group of 9 or more carbon atoms and having an aromatic hydrocarbon structure at the same time.

A group of 9 or more carbon atoms and having an aromatic hydrocarbon structure of the present invention indicates a group having a sum of the carbon atoms of 9 or more, and the group containing an aromatic hydrocarbon structure indicates a group having a sum of the carbon atoms of 9 or more in $R_3$ and containing an aromatic hydrocarbon structure at an arbitrary locations in $R_3$. An example of an aromatic hydrocarbon structure is an aryl group (for example, a phenyl group and a naphthyl group). For example, when an aromatic hydrocarbon structure is a phenyl group, $R_3$ is formed with an arbitrary group of 3 or more carbon atoms. In this case, 3 or more groups having a sum of carbon number of 1 can be combined to form $R_3$, or a group having a sum of carbon number of 1 and a group having a sum of carbon number of 2 can be combined to form $R_3$. The sum of carbon number in $R_3$ is preferably from 9 to 40, more preferably, it is from 12 to 40, and still more preferably, it is from 14 to 30.

A preferable $R_3$ is represented by the following Formula (3).

Formula (3)

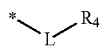

In Formula (3), L represents a divalent linking group selected from the group consisting of: an alkylene group of 1 to 15 carbon atoms, $-SO_2O-$, $-OSO_2-$, $-SO_2-$, $-CO-$, $-O-$, $-S-$, $-SO_2NH-$, $-NHSO_2-$, $-CONH-$, $-NHCO-$, $-COO-$ and $-OOC-$, or a group formed by a combination thereof. At the position of (*), L links to an oxygen atom adjacent to $R_3$ in Formula (3).

L may have a substituent. Examples of the aforesaid substituent are the synonymous groups which can substitute to $R_1$ in Formula (1).

A preferable divalent linking group represented by L is an alkylene group or a group containing an alkylene group. The group containing an alkylene group indicates a divalent linking group which contains an alkylene group at an arbitrary position. Specific examples thereof include a combination of an alkylene group with a divalent linking group selected from the group of: an alkylene group, $-SO_2O-$, $-OSO_2-$, $-SO_2-$, $-CO-$, $-O-$, $-S-$, $-SO_2NH-$, $-NHSO_2-$, $-CONH-$, $-NHCO-$, $-COO-$ and $-OOC-$, or a combination of an alkylene group with a group formed by a plurality of the above-described divalent linking groups.

$R_4$ represents an aryl group (for example, a phenyl group or a naphtyl group).

Specific examples of the divalent linking group represented by L are shown below, however, the present invention is not limited to them.

L-1

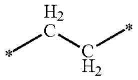

L-2

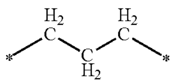

L-3

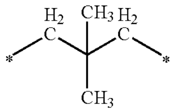

L-4

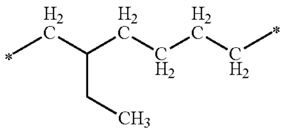

L-5

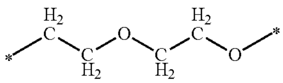

L-6

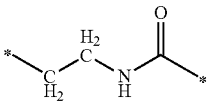

L-7

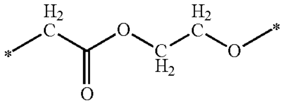

L-8

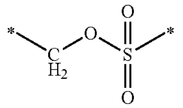

L-9

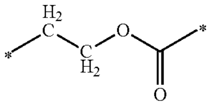

L-10

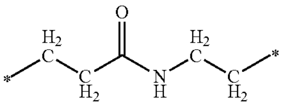

-continued

L-11

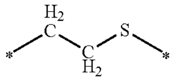

L-12

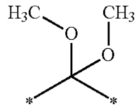

L-13

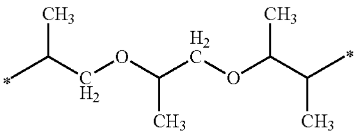

L-14

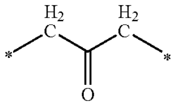

L-15

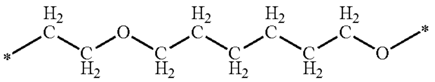

L-16

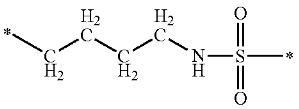

L-17

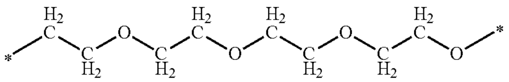

L-18

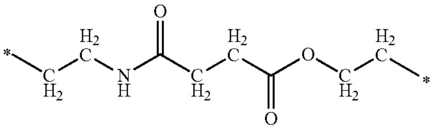

L-19

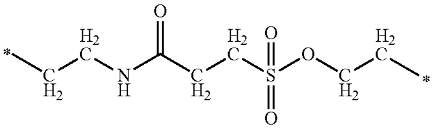

L-20

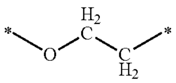

L links to an oxygen atom adjacent to $R_3$ in Formula (1) and links to $R_4$.

$R_4$ represents an aryl group (for example, a phenyl group and a naphtyl group).

$R_3$ and $R_4$ may have a substituent. Examples of the aforesaid substituent are the synonymous groups which can substitute to $R_1$ in Formula (1).

Preferable substituents which are substituted to L, $R_3$ and $R_4$ include: an alkyl group, an alkoxyl group, an aryloxy group, an alkylthio group, an aryl thio group, an alkoxycarbonyl group, an aryloxycarbonyl group, a sulfamoyl group, an acyl group, an acyloxy group, an amide group, a carbamoyl group, an alkyl sulfonyl group, an arylsulfonyl group, an amino group, a cyano group, a nitro group and a halogen atom. More preferable substituents are: an alkyl group, an alkoxyl group, an aryloxy group, an alkoxycarbonyl group, an aryloxycarbonyl group, a sulfamoyl group, an acyl group, an acyloxy group, an amide group and a carbamoyl group. And especially preferable substituents are: an alkyl group, an alkoxyl group, an aryloxy group, an alkoxycarbonyl group, an acyloxy group and an amide group.

$R_4$ is preferably a phenyl group, and more preferably, a phenyl group having a substituent. More preferably, $R_4$ is a phenyl group having a substituent of an alkyl group, an alkoxyl group, an aryloxy group, an alkoxycarbonyl group, an acyloxy group, or an amide group. Still more preferably, $R_4$ is a phenyl group having an alkyl group or an alkoxyl group.

$R_3$ or Formula (3) is preferably a group represented by the following Formula (3-2).

Formula (3-2)

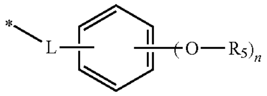

In Formula (3-2), L and "*" each represent the synonymous groups of L and "*" in Formula (3). $R_5$ represents an alkyl group of 8 to 30 carbon atoms. "n" is an integer of 1 to 3.

More preferably, $R_5$ represents an alkyl group of 12 to 24 carbon atoms. Still more preferably, $R_5$ represents an alkyl group of 16 to 24 carbon atoms. $R_5$ may have a substituent. Examples of the aforesaid substituent are the synonymous groups which can substitute to $R_1$ in Formula (1). $R_5$ is preferably a strait chain alkyl group and it is more preferable that the strait chain alkyl group is consisted of carbon atoms and hydrogen atoms.

"n" is preferably an integer of 1 or 2. Most preferably, "n" is 1.

Specific examples of the metal-containing compound represented by Formula (1) are shown, however, the present invention is not limited to them. The symbol "*" in tables indicates the linking place of each group.

| Compound No. | $R_1$ | $R_2$ | $R_3$ |
|---|---|---|---|
| 1 | $CH_3$—* | 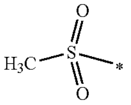 | 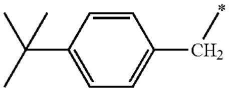 |
| 2 | $CH_3$—* | NC—* | 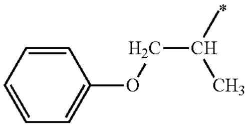 |
| 3 | $CH_3$—* | NC—* | 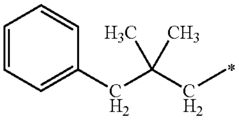 |
| 4 | $CH_3$—* | 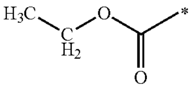 | 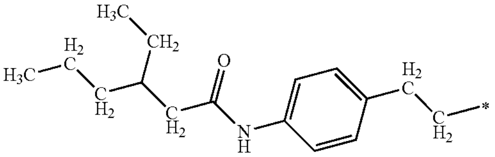 |
| 5 | $CH_3$—* | NC—* | 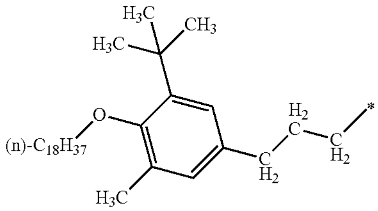 |
| 6 | $CH_3$—* | 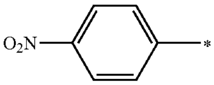 | 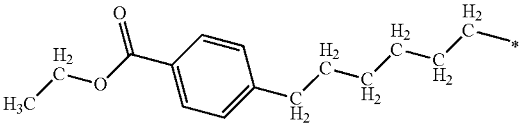 |

| Compound No. | $R_1$ | $R_2$ | $R_3$ |
|---|---|---|---|
| 7 | $CH_3$—* | NC—* | 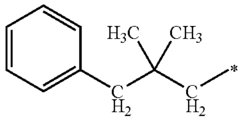 |
| 8 | $CH_3$—* | NC—* | 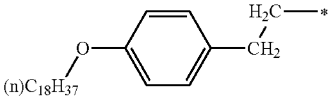 |
| 9 | $CH_3$—* | 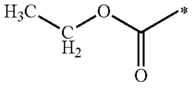 | 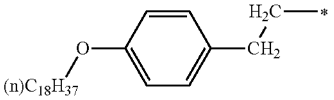 |
| 10 | $CH_3$—* | 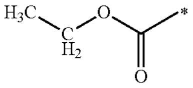 | 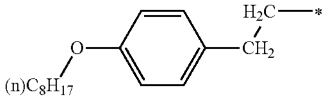 |
| 11 | $CH_3$—* | NC—* | 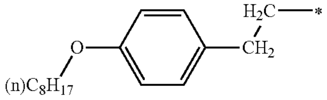 |
| 12 | $CH_3$—* | NC—* | 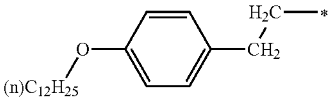 |
| 13 | $CH_3$—* | NC—* | 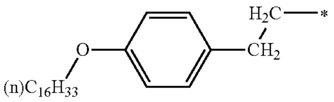 |
| Compound No. | $R_1$ | $R_2$ | $R_3$ |
|---|---|---|---|
| 14 | $CH_3$—* | 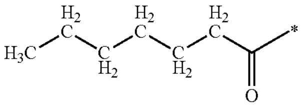 | 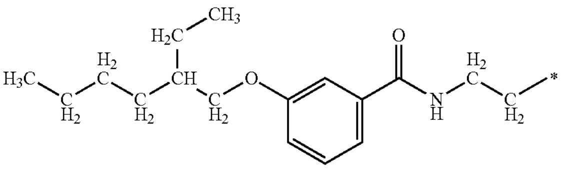 |
| 15 | $CH_3$—* | NC—* | 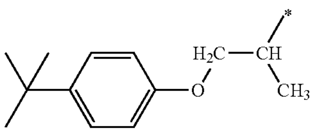 |
| 16 | $CH_3$—* | NC—* | 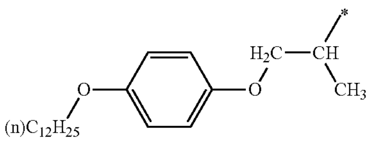 |

-continued
| Compound No. | $R_1$ | $R_2$ | $R_3$ |
|---|---|---|---|
| 17 | $C_2H_5$—* | 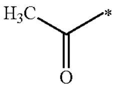 | 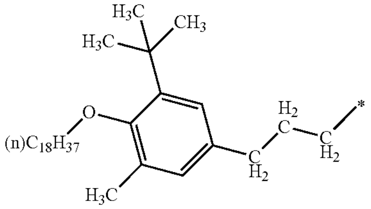 |
| 18 | $C_2H_5$—* | NC—* | 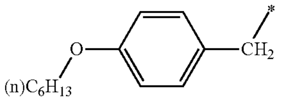 |
| 19 | $CH_3$—* | NC—* | 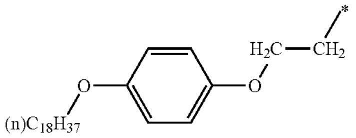 |
| Compound No. | $R_1$ | $R_2$ | $R_3$ |
|---|---|---|---|
| 20 | $C_2H_5$—* | 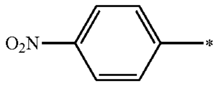 | 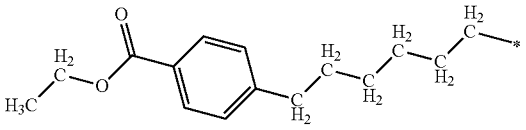 |
| 21 | $CH_3$—* | NC—* | 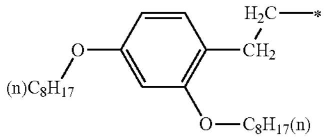 |
| 22 | $(CH_3)_2CH$—* | 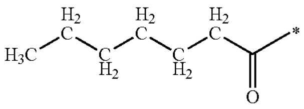 | 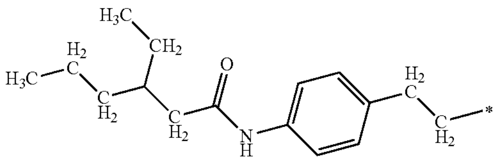 |
| 23 | $(CH_3)_3CH$—* | 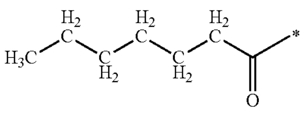 | 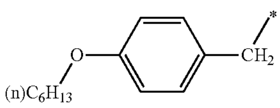 |
| 24 | $CH_3$—* | NC—* | 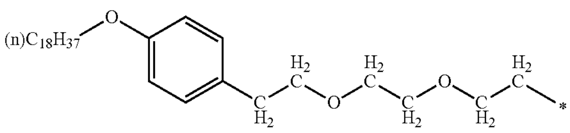 |
| 25 | $CH_3$—O—$C_2H_4$—* | 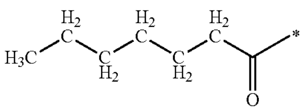 | 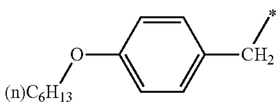 |

-continued
| Compound No. | $R_1$ | $R_2$ | $R_3$ |
|---|---|---|---|
| 26 | 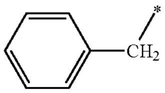 | NC—* | 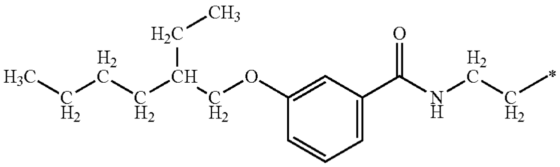 |
| Compound No. | $R_1$ | $R_2$ | $R_3$ |
|---|---|---|---|
| 27 | 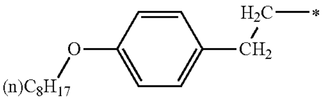 | NC—* | 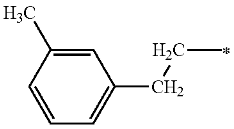 |
| 28 | $CH_3$—* | 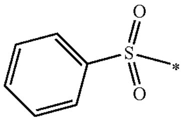 | 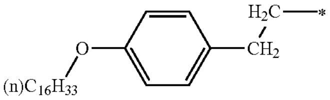 |
| 29 | $CH_3$—* | 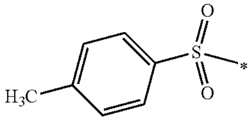 | 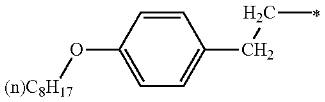 |
| 30 | $CH_3$—* | NC—* | 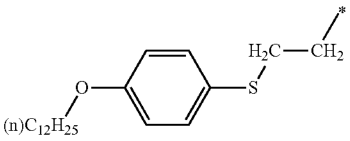 |
| 31 | $CH_3$—* | NC—* | 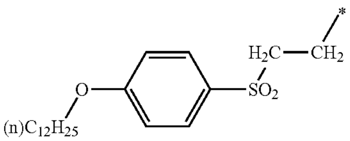 |
| 32 | $CH_3$—* | NC—* | 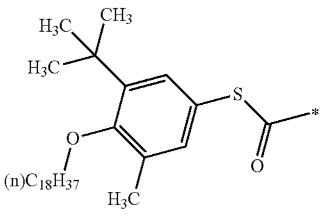 |

| Compound No. | $R_1$ | $R_2$ | $R_3$ |
|---|---|---|---|
| 33 | $CH_3$—* | NC—* | 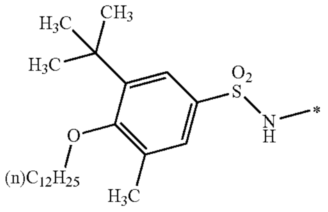 |
| 34 | $CH_3$—* | NC—* | 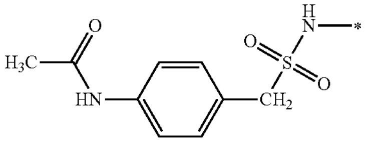 |
| 35 | $C_2H_5$—* | NC—* | 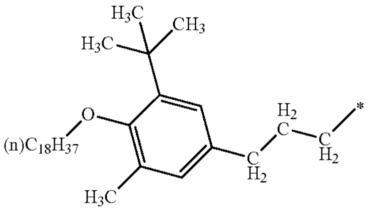 |
| 36 | $CH_3$—* | NC—* | 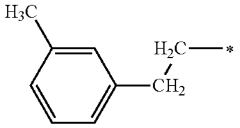 |
| 37 | $CH_3$—* | 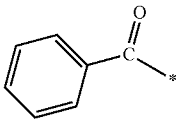 | 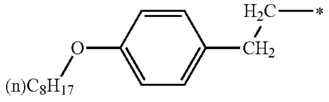 |
| Compound No. | $R_1$ | $R_2$ | $R_3$ |
|---|---|---|---|
| 38 | $(n)C_4H_9$—* | NC—* | 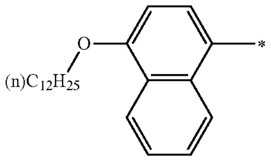 |
| 39 | 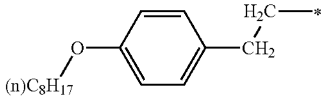 | NC—* | 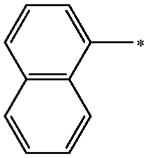 |
| 40 | $CH_3$—* | NC—* | 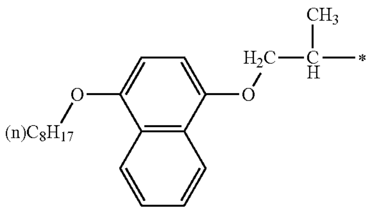 |

-continued

| Compound No. | $R_1$ | $R_2$ | $R_3$ |
|---|---|---|---|
| 41 | $CH_3CH_2C(CH_3)_2$—* | H—* | 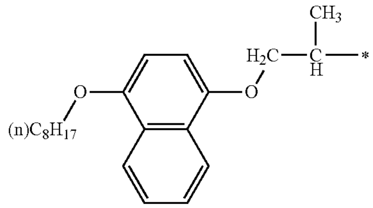 |
| 42 | $CH_3$—* | 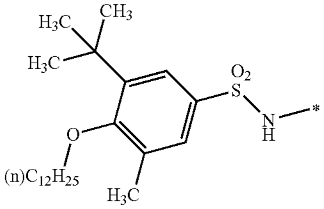 | 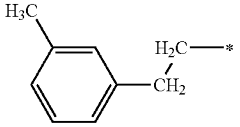 |

| Compound No. | $R_1$ | $R_2$ | $R_3$ |
|---|---|---|---|
| 43 | 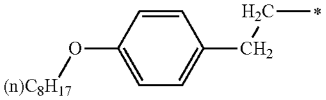 | Cl—* | 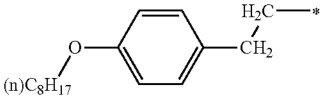 |
| 44 | $CH_3$—* | Br—* | 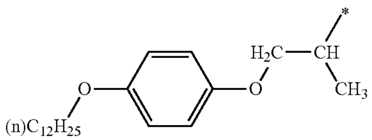 |
| 45 | $CH_3$—* | $CH_3$—O—C(=O)—* | 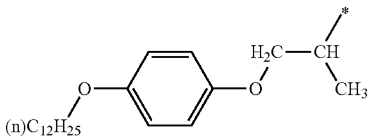 |
| 46 | $CH_3$—* | $CH_3$—C(=O)—* | 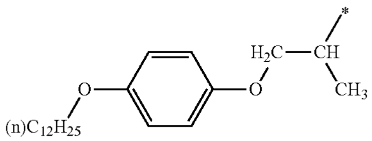 |
| 47 | $CH_3$—* | $C_6H_5$—O—C(=O)—* | 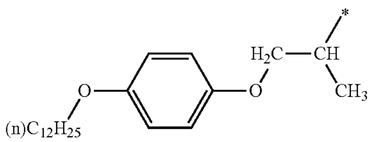 |

When the metal-containing compound of the present invention is used by adding to the electrophotographic toner, it is employed at least one dye which can chelate so as to form an image. The dye which can chelate is a compound which is capable of chelating to the metal-containing compound of the present invention. Preferable dyes as described above include: the dyes described in JP-A Nos. 03-114892, 04-62092, 04-62094, 04-82896, 05-16545, 05-177958 and 05-301470.

A dye represented by the following Formula (4) is preferably cited as a yellow dye for the present invention.

Formula (4)

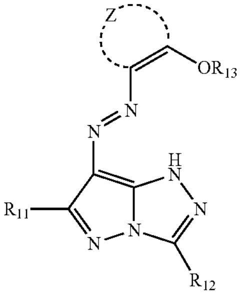

In Formula, $R_{11}$ and $R_{12}$ each represents a hydrogen atom or a substituent; $R_{13}$ represents an alkyl group or an aryl group which may have a substituent; Z represents a group of atoms necessary to form a 5 or 6 membered aromatic ring formed with two carbon atoms.

$R_{11}$ and $R_{12}$ each are preferably a substituent. When $R_{11}$ and $R_{12}$ represent a substituent, examples of the substituent are the synonymous groups which can substitute to $R_1$ in Formula (1). When $R_{11}$ and $R_{12}$ each represent a substituent, preferably, the substituent is an alkyl group, an aryl group or a hetero aryl group. These may further have a substituent, and examples of the substituent are the synonymous groups which can substitute to $R_1$ in Formula (1).

$R_{13}$ represents an alkyl group or an aryl group which may have a substituent. Examples of the substituent are the synonymous groups which can substitute to $R_1$ in Formula (1).

Examples of a 5 or 6 membered aromatic ring formed with two carbon atoms are the synonymous groups of an aryl group or a hetero aryl group among the groups which can substitute to $R_1$ in Formula (1). These groups may further have a substituent, and examples of the substituent are the synonymous groups which can substitute to $R_1$ in Formula (1).

The dye represented by Formula (4) can be prepared as follows. At first, a compound represented by Formula (A) is subjected to diazotization in accordance with the method described in Chemical Reviews, Vol. 75, 241 (1975). Then, the diazotized compound is coupled with a compound represented by Formula (B) with a known method.

Formula (A)

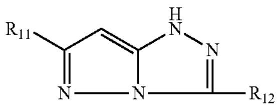

Formula (B)

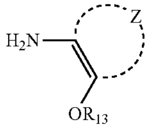

In Formulas, $R_{11}$, $R_{12}$, $R_{13}$ and Z each are respectively synonymous with $R_{11}$, $R_{12}$, $R_{13}$ and Z in Formula (4).

Specific examples of a yellow dye represented by Formula (4) are shown below, however, the present invention is not limited to them.

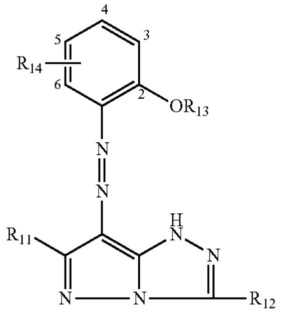

| Compound No. | $R_{11}$ | $R_{12}$ | $R_{13}$ | $R_{14}$ |
|---|---|---|---|---|
| Y-1 | —$CH_3$ | —$C_4H_9$ | —$CH_3$ | — |
| Y-2 | —$C_3H_7$(i) | 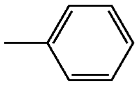 | —$CH_3$ | — |
| Y-3 | —$C_3H_7$(i) | —$C_2H_5$ | —$CH_3$ | — |
| Y-4 | —$CH_3$ | —$C_2H_5$ | —$CH_3$ | — |
| Y-5 | —$C_3H_7$(i) | 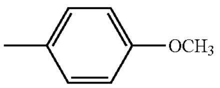 | —$CH_3$ | 4-Cl |
| Y-6 | —$C_3H_7$(i) | —$C_2H_5$ | —$CH_3$ | 4-$CO_2CH_3$ |
| Y-7 | —$C_3H_7$(i) | —$C_4H_9$ | —$CH_3$ | 5-$CO_2CH_3$ |
| Y-8 | —$C_4H_9$(t) | —$C_4H_9$ | —$CH_3$ | — |
| Y-9 | —$C_3H_7$(i) | 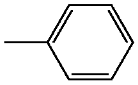 | —$C_3H_7$(i) | — |

-continued
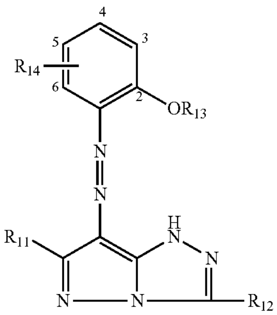
| Compound No. | $R_{11}$ | $R_{12}$ | $R_{13}$ | $R_{14}$ |
|---|---|---|---|---|
| Y-10 | $-C_3H_7(i)$ | 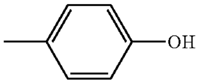 | $-CH_3$ | — |
| Y-11 | $-C_3H_7(i)$ | $-C_3H_7$ | $-CH_3$ | 5-Cl |
| Y-12 | $-C_3H_7(i)$ | 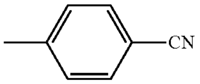 | $-CH_3$ | — |
| Y-13 | $-C_4H_9(t)$ | 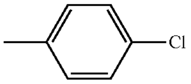 | $-CH_3$ | — |
| Y-14 | $-SCH_3$ | 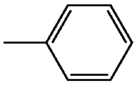 | $-CH_3$ | — |
| Y-15 | 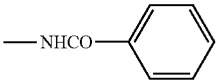 | $-C_2H_5$ | $-CH_3$ | — |
| Y-16 | 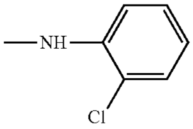 | $-C_2H_5$ | $-CH_3$ | — |
| Y-17 | $-OCH_3$ | $-C_4H_9$ | $-CH_3$ | — |
| Y-18 | $-C_4H_9(t)$ | $-C_4H_9$ | $-CH_3$ | $4-CO_2H$ |
| Y-19 | $-C_3H_7(i)$ | 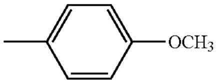 | $-CH_3$ | — |
| Y-20 | $-C_3H_7(i)$ | 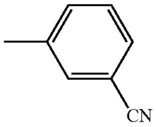 | $-CH_3$ | — |
| Y-24 | $-C_3H_7(i)$ | $-C_2H_5$ | $-CH_3$ | 5-Cl |
| Y-25 | $-C_4H_9(t)$ | $-C_4H_9$ | $-CH_3$ | 5-Cl |
| Y-26 | $-C_4H_9(t)$ | $-C_2H_5$ | $-CH_3$ | 5-Cl |
| Y-27 | $-C_4H_9(t)$ | 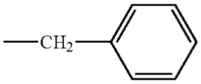 | $-CH_3$ | 5-Cl |

-continued
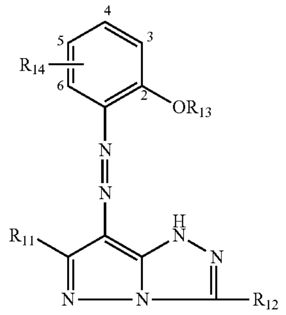
| Compound No. | $R_{11}$ | $R_{12}$ | $R_{13}$ | $R_{14}$ |
|---|---|---|---|---|
| Y-28 | $-C_4H_9(t)$ | 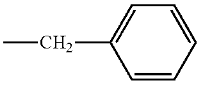 | $-CH_3$ | — |
| Y-29 | $-C_4H_9(t)$ | 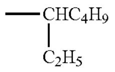 | $-CH_3$ | 5-Cl |
| Y-30 | $-C_4H_9(t)$ | $-C_6H_{13}$ | $-CH_3$ | 5-Cl |
| Y-31 | $-C_4H_9(t)$ | $-CH_3$ | $-CH_3$ | 5-Cl |
| Y-32 | $-C_4H_9(t)$ | $-CH_3$ | $-CH_3$ | — |
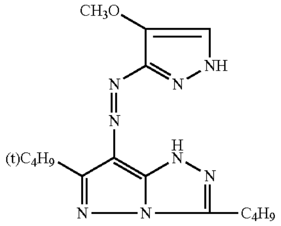
Y-21
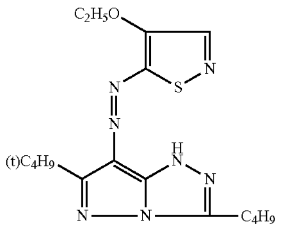
Y-22
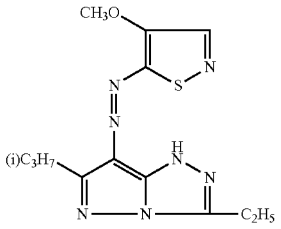
Y-23
A dye represented by the following Formula (5) is preferably cited as a magenta dye for the present invention.

Formula (5)

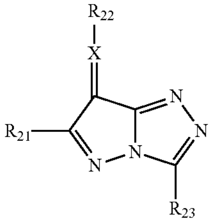

In Formula, $R_{21}$ represents a hydrogen atom or a substituent, and $R_{22}$ represents an aryl group or a hetero aryl group which may have a substituent. X represents a methine group or a nitrogen atom.

$R_{23}$ is represented by Formulas (6) or (7).

Formula (6)

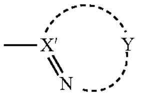

Formula (7)

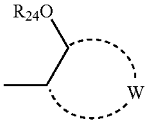

In Formulas, X' represents a carbon atom or a nitrogen atom, and Y represents a group of atoms which form a nitrogen-containing aromatic heterocycle. W represents a group of atoms which form an aryl group or a hetero aryl group. $R_{24}$ represents an alkyl group.

$R_{21}$ is preferably a substituent. When $R_{21}$ represents a substituent, examples of the substituent are the synonymous groups which can substitute to $R_1$ in Formula (1). When $R_{21}$ represents a substituent, preferably, the substituent is an alkyl group, an aryl group or a hetero aryl group. These may further have a substituent, and examples of the substituent are the synonymous groups which can substitute to $R_1$ in Formula (1).

$R_{22}$ represents an alkyl group or an aryl group which may have a substituent. Examples of the substituent are the synonymous groups of an aryl group or a hetero aryl group among the groups which can substitute to $R_1$ in Formula (1). These may further have a substituent, and examples of the substituent are the synonymous groups which can substitute to $R_1$ in Formula (1).

Y represents a group of atoms which forms a nitrogen-containing aromatic heterocycle. Examples of the nitrogen-containing aromatic heterocycle are the corresponding hetero aryl groups among the groups which can substitute to $R_1$ in Formula (1).

W represents a group of atoms which form an aryl group or a hetero aryl group. Examples of the formed aryl group or hetero aryl group are the synonymous groups of an aryl group or a hetero aryl group among the groups which can substitute to $R_1$ in Formula (1).

A dye represented by Formula (5) can be prepared according to the conventionally known method. For example, an azomethine dye represented by Formula (5) can be prepared according to an oxidation coupling method described in JP-A Nos. 63-113077, 3-275767 and 4-89287.

Specific examples of a magenta dye represented by Formula (5) are shown below, however, the present invention is not limited to them.

Substituent $R_{21}$ (1) $-CH_3$ (2) $-C_4H_9(t)$ (3)

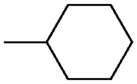

(4)

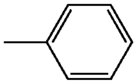

(5)

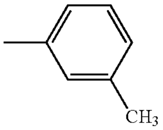

(6)

(7)

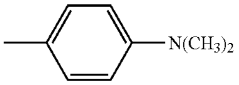

(8)

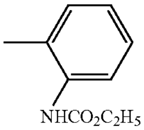

(9)

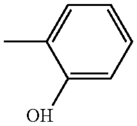

(10)

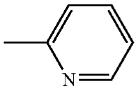

(11)

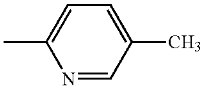

(12)

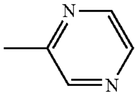

(13)

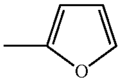

(14)

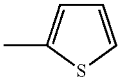

(15)

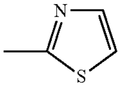

-continued
(16)
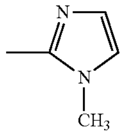
(17)
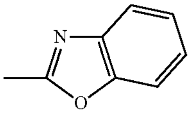
(18)
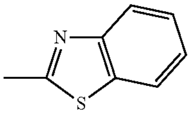
(19)
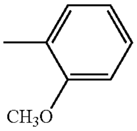
(20)
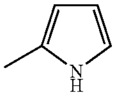
Substituent $R_{22}$
(1)
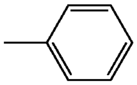
(2)
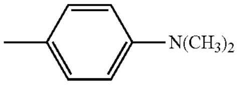
(3)
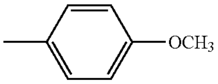
(4)
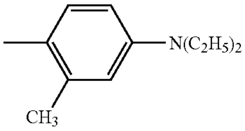
(5)
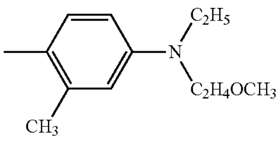
(6)
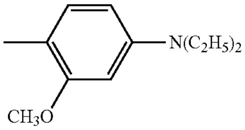
-continued
(7)
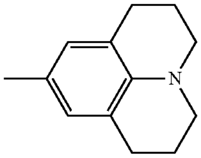
(8)
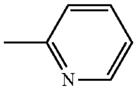
(9)
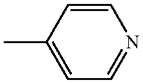
(10)
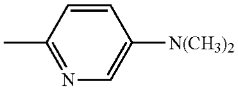
(11)
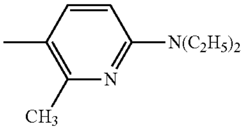
(12)
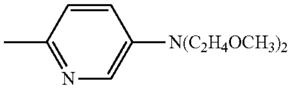
(13)
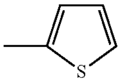
(14)
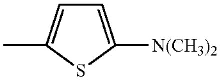
(15)
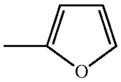
(16)
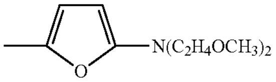
(17)
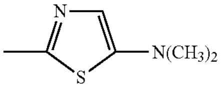
(18)
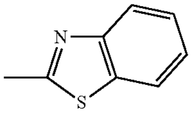
(19)
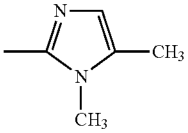
(20)
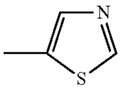

-continued
(21)
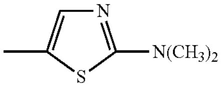
(22)
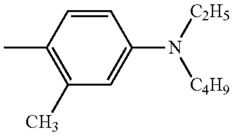
(23)
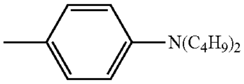
(24)
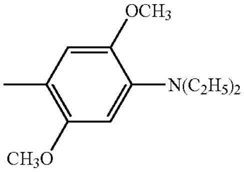
(25)
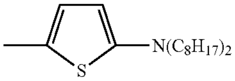
Substituent $R_{23}$
(1)
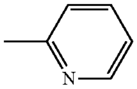
(2)
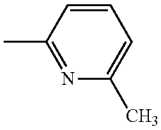
(3)
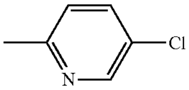
(4)
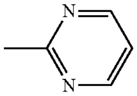
(5)
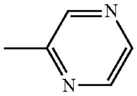
(6)
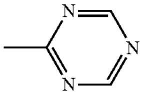
(7)
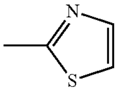
-continued
(8)
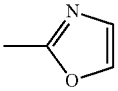
(9)
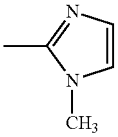
(10)
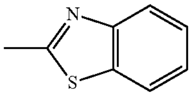
(11)
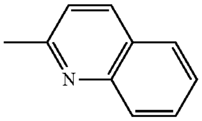
(12)
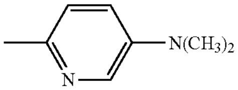
(13)
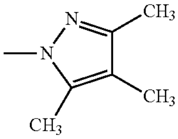
(14)
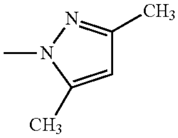
(15)
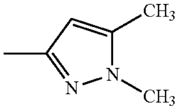
(16)
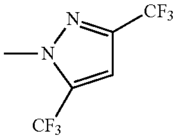
(17)
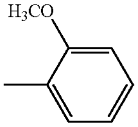
(18)
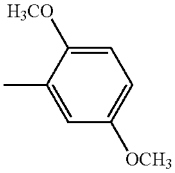

-continued
(19)
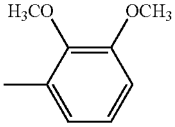
(20)
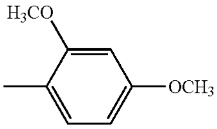
(21)
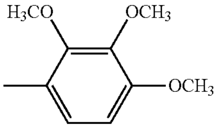
(22)
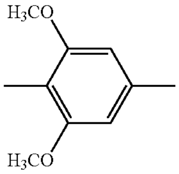
(23)
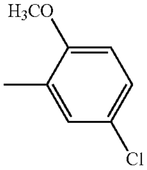
(24)
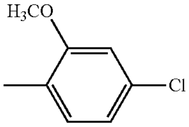
(25)
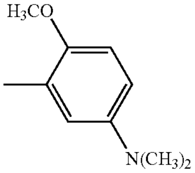
(26)
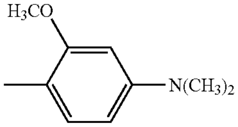
(27)
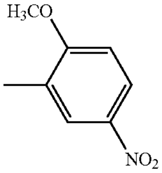
(28)
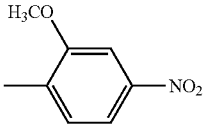
-continued
(29)
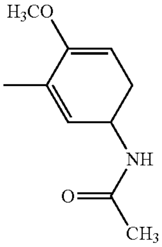
(30)
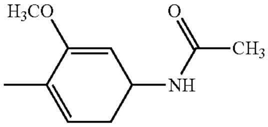
(31)
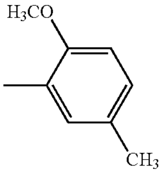
(32)
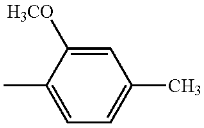
(33)
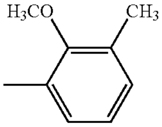
(34)
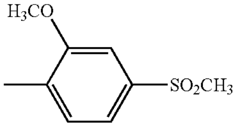
| Dye | $R_{21}$ | $R_{22}$ | $R_{23}$ | X |
|---|---|---|---|---|
| M-1 | (1) | (2) | (15) | N |
| M-2 | (1) | (6) | (9) | N |
| M-3 | (1) | (6) | (10) | N |
| M-4 | (1) | (11) | (7) | N |
| M-5 | (1) | (11) | (8) | N |
| M-6 | (1) | (17) | (8) | CH |
| M-7 | (1) | (20) | (6) | CH |
| M-8 | (1) | (21) | (7) | CH |
| M-9 | (2) | (4) | (3) | N |
| M-10 | (2) | (4) | (5) | N |
| M-11 | (2) | (4) | (6) | N |
| M-12 | (2) | (8) | (3) | CH |
| M-13 | (2) | (10) | (4) | CH |
| M-14 | (2) | (11) | (1) | N |
| M-15 | (2) | (13) | (15) | CH |
| M-16 | (2) | (14) | (1) | CH |
| M-17 | (2) | (14) | (4) | N |
| M-18 | (2) | (19) | (5) | CH |
| M-19 | (3) | (5) | (2) | N |
| M-20 | (3) | (16) | (9) | CH |
| M-21 | (3) | (18) | (10) | CH |
| M-22 | (4) | (3) | (2) | CH |
| M-23 | (4) | (3) | (14) | N |
| M-24 | (4) | (7) | (13) | N |
| M-25 | (4) | (10) | (11) | N |

-continued

| Dye | $R_{21}$ | $R_{22}$ | $R_{23}$ | X |
|---|---|---|---|---|
| M-26 | (4) | (13) | (12) | CH |
| M-27 | (4) | (15) | (11) | CH |
| M-28 | (5) | (9) | (14) | CH |
| M-29 | (5) | (12) | (13) | CH |
| M-30 | (5) | (21) | (12) | N |
| M-31 | (10) | (2) | (15) | N |
| M-32 | (16) | (13) | (15) | CH |
| M-33 | (17) | (18) | (15) | N |
| M-34 | (18) | (21) | (15) | CH |
| M-35 | H | (7) | (16) | CH |
| M-36 | H | (16) | (16) | N |
| M-37 | (2) | (4) | (5) | CH |
| M-38 | (2) | (22) | (5) | CH |
| M-39 | (2) | (25) | (17) | CH |
| M-40 | (1) | (25) | (17) | CH |
| M-41 | (4) | (25) | (17) | CH |
| M-42 | (4) | (22) | (17) | CH |
| M-43 | (4) | (22) | (28) | CH |
| M-44 | (2) | (14) | (18) | CH |
| M-45 | (2) | (25) | (25) | CH |

A dye represented by the following Formula (8) is preferably cited as a magenta dye for the present invention.

Formula (8)

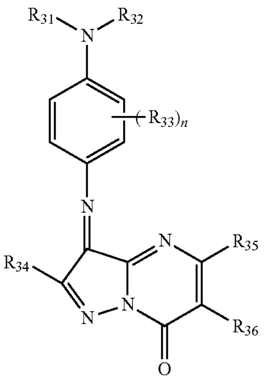

In Formula, $R_{31}$ and $R_{32}$ each represents a substituted or non-substituted alkyl group, and $R_{33}$ represents a substituent. "n" is an integer of 0 to 4, when "n" is 2 or more, a plurality of $R_{33}$ s may the same or different. $R_{34}$, $R_{35}$ and $R_{36}$ each represent an alkyl group, and $R_{34}$, $R_{35}$ and $R_{36}$ may be the same or different, provided that $R_{35}$ and $R_{36}$ each represent an alkyl group of 3 to 8 carbon atoms.

Examples of the substituent represented by $R_{33}$ are the synonymous groups which can substitute to $R_1$ in Formula (1).

A dye represented by Formula (8) can be prepared according to the conventionally known method. For example, it can be prepared according to an oxidation coupling method described in JP-A Nos. 2000-255171, 2001-334755 and 2002-234266.

Specific examples of a cyan dye represented by Formula (8) are shown below, however, the present invention is not limited to them.

C-1

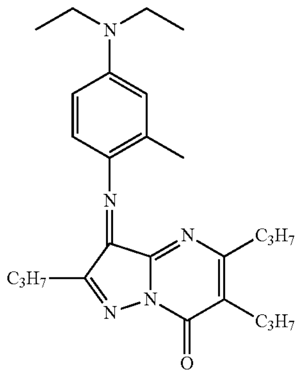

C-2

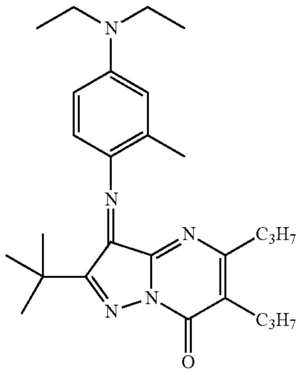

C-3

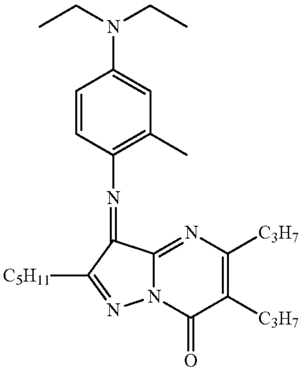

C-4

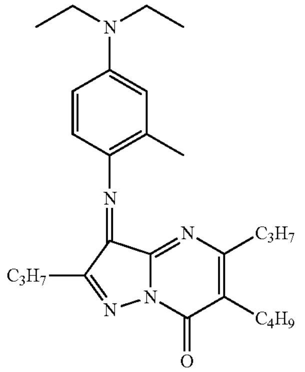

-continued
C-5
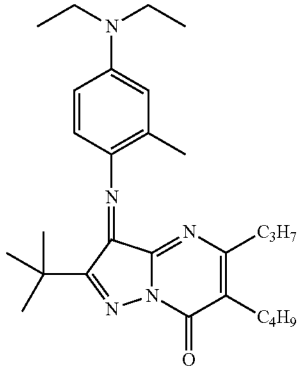
C-6
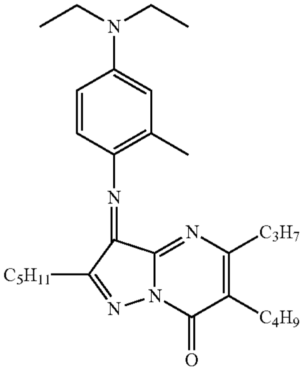
C-7
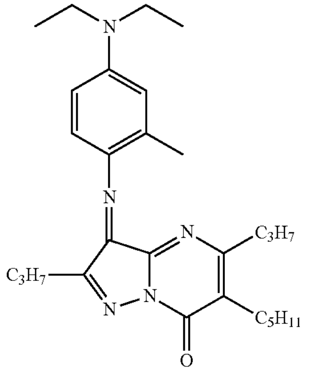
C-8
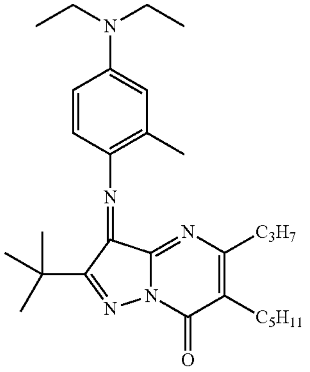
-continued
C-9
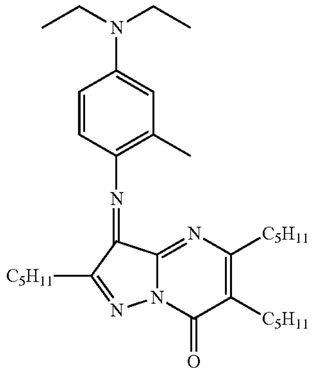
C-10
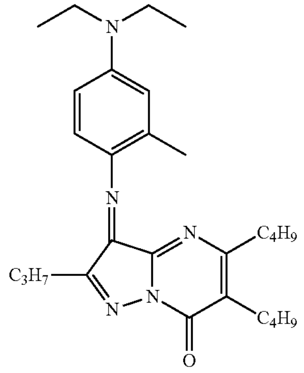
C-11
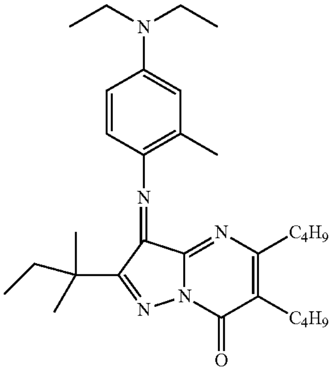
C-12
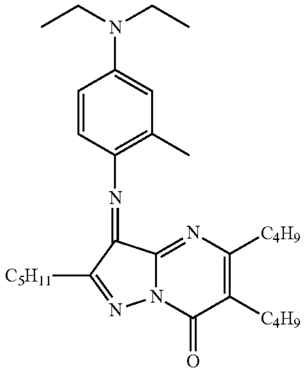

-continued
C-13
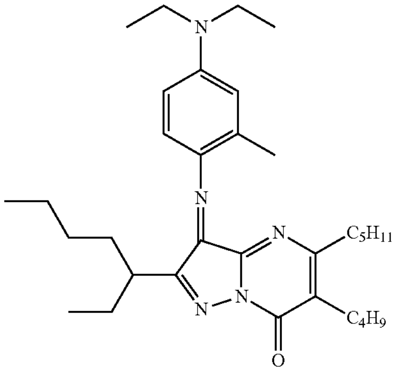
C-14
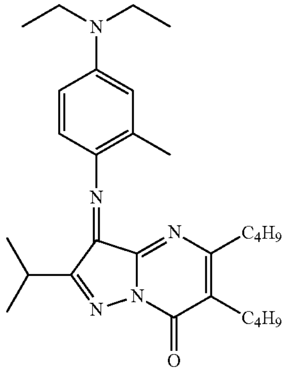
C-15
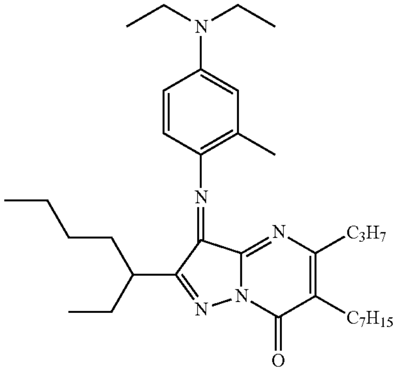
C-16
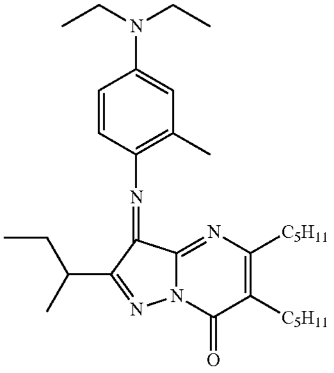
-continued
C-17
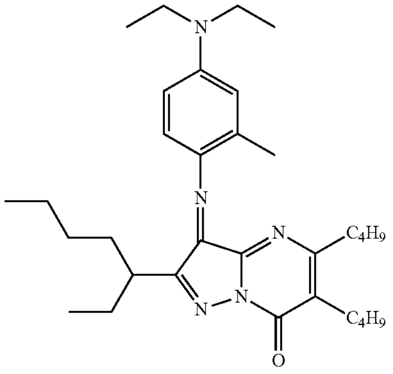
C-18
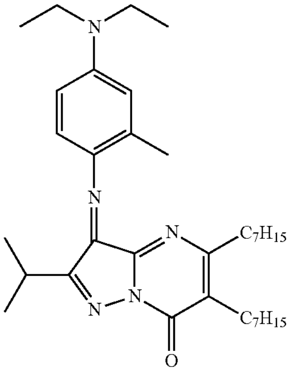
C-19
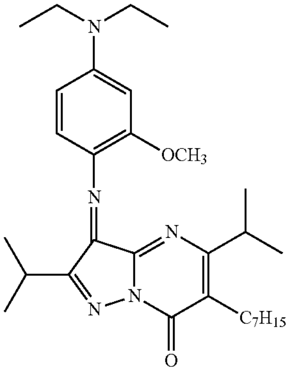
C-20
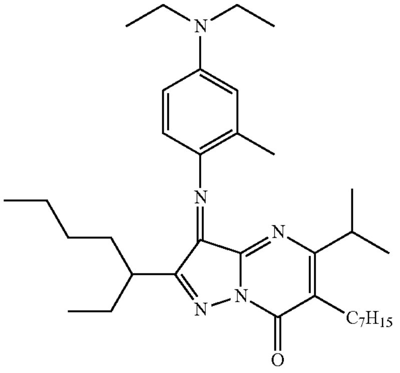

-continued
C-21
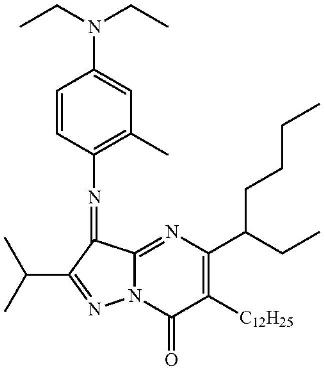
C-22
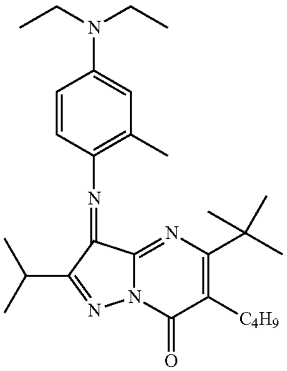
C-23
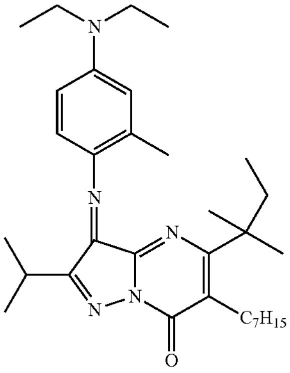
C-24
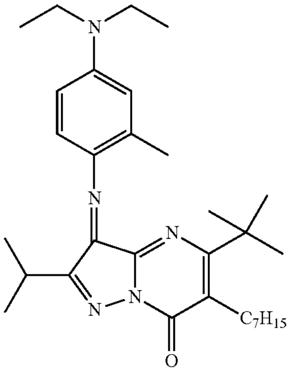
-continued
C-25
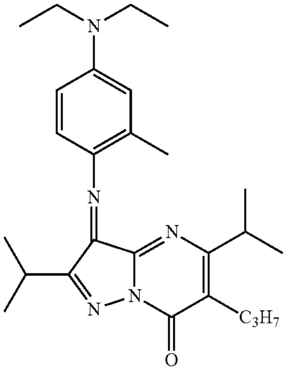
C-26
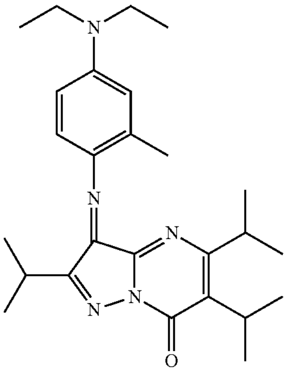
C-27
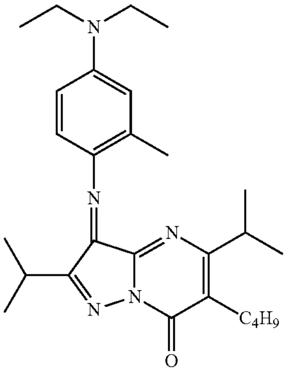
C-28
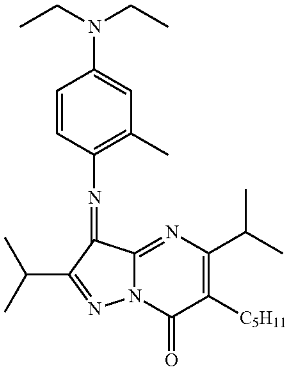

-continued
C-29
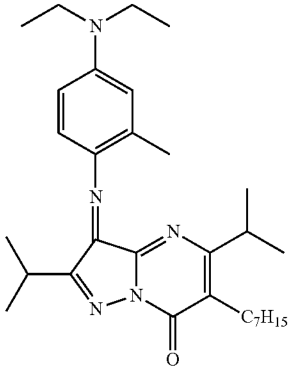
C-30
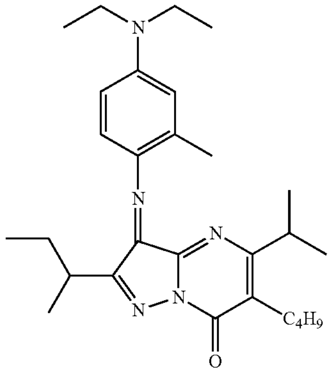
C-31
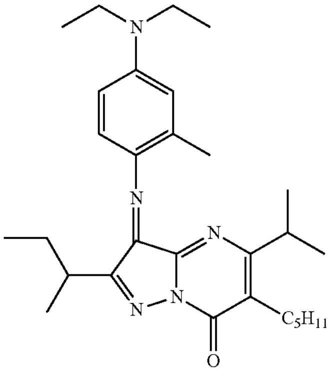
C-32
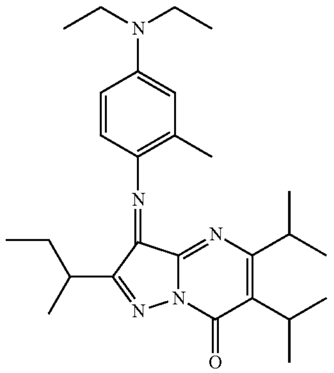
-continued
C-33
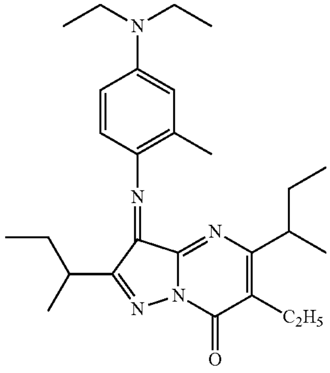
C-34
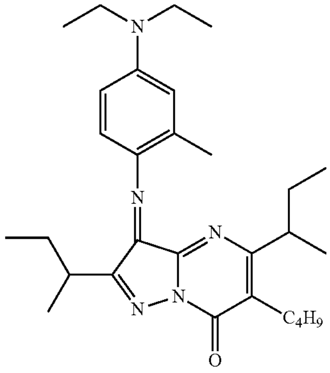
C-35
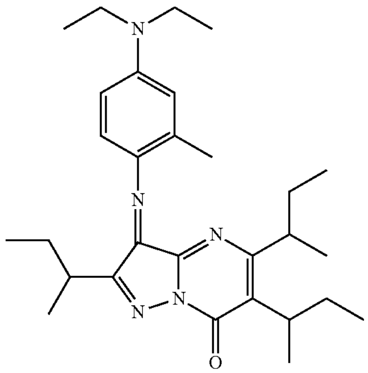
C-36
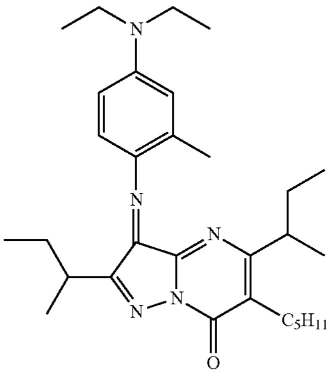
A metal-chelated dye which is formed from a metal-containing compound represented by Formula (1) with a dye represented by Formulas (4), (5) or (8) is represented Formulas (9), (10), or (11).

Formula (9)

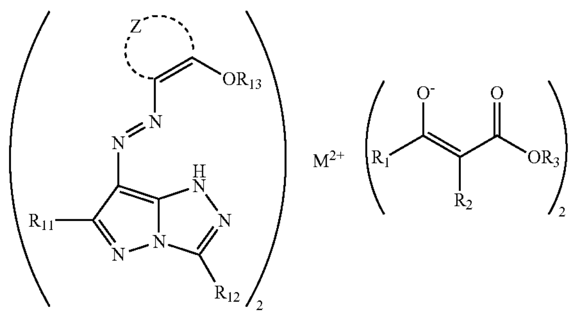

Formula (10)

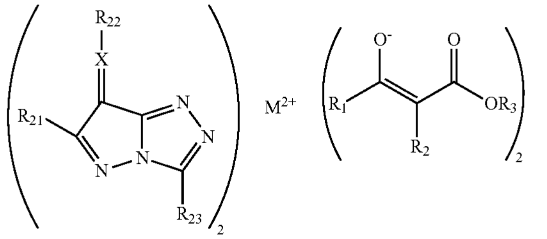

Formula (11)

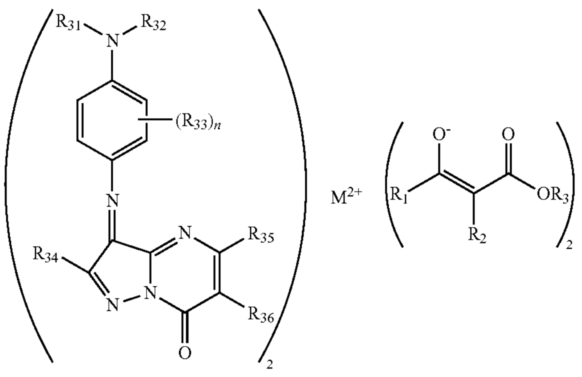

In Formulas (9), (10), and (11), $R_{11}$, $R_{12}$, $R_{13}$, $R_{21}$, $R_{22}$, $R_{23}$, $R_{31}$, $R_{32}$, $R_{33}$ and $R_{34}$ each respectively represent the synonymous group described for Formulas (4), (5), and (8). Moreover, $R_1$, $R_2$ and $R_3$ each represent the synonymous group described for Formulas (1). $M^{2+}$ represents a copper (II) ion.

The chelated dye used for the present invention can be used for various applications other than for an electrophotographic toner. As application for a toner, the chelated dye can be used according to the method described in JP-A Nos. 10-265690 and 2000-345059, however, the application fields and methods are not limited to them.

The electrophotographic toner of the invention will be described in the following.

(Dispersing Method of Dye)

The electrophotographic toner of the invention can be produced by the following methods in which a dye dispersion liquid is directly dispersed in a binder resin or mixed with a colored fine particle dispersion and a later-mentioned desired additive is added, and then the resulted material is subjected to various methods such as a knead-crashing method, suspension polymerization method, emulsion polymerization method, emulsifying dispersion particle producing method and encapsulating method. Among these methods, the emulsion polymerization method is preferred from the viewpoint of the cost and the production stability of the producing when the particle size reducing for rising in the image quality is considered. In the emulsion polymerization method, a thermoplastic resin emulsion prepared by emulsion polymerization is mixed with a dispersion of toner particle component such as a dispersion of solid particles of dye and particles are formed by controlling pH. The resultant particles are gradually associated while taking balance between the repulsion force of the surface of formed particle and the coagulating force caused by the addition of electrolyte. The association is carried out while controlling the size and shape of the particle and the inter-particle fusion and shape of the associated particle are controlled by stirring and heating to produce the toner particle.

When the dye dispersion is prepared by direct dispersion, the dispersion can be carried out by using commonly employed machines such as: a bead dispersing machine, a high speed stirring dispersing machine or a medium using type stirrer. The dispersion can be also prepared by the same method as used for producing the colored particle dispersion. Namely, the dye is dissolved (or dispersed) in an organic solvent and emulsified in water and then the organic solvent is removed.

(Colored Particles)

In the electrophotographic toner of the present invention, the colored particles can be dispersed in the thermoplastic resin. The colored fine particle contains at least one kind of metal complex compound represented by Formula (1). The dispersed particle diameter can be controlled by using a dispersing method such as the later-mentioned dry-in-liquid method. The electrophotographic toner of the present invention may further contain a resin having a different composition from the thermoplastic resin or a high-boiling solvent. In the toner using the above dye, the colored particles (including simply dispersed dye) can be dispersed in the thermoplastic resin instead of directly dispersing or dissolving the dye into the toner binder resin such as the method applied for usually known toner using a dye.

The dye in the colored fine particle is dissolved in the resin at the level of molecule state. Accordingly, it is considered that the transparency of each of mono-color images is increased so that the transparence of overlapped color image is also improved.

Figure 2:
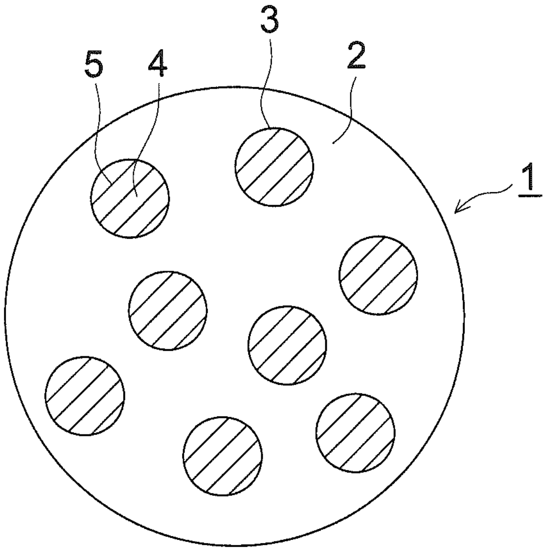
FIG. 2 shows a schematic cross section of a toner particle containing colored particles dispersed in a thermoplastic resin.
Figure 3:
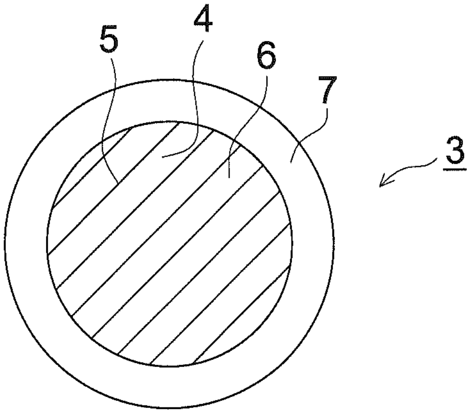
FIG. 3 shows a schematic cross section of a colored particle having a core/shell structure constituted by an inner portion (core) covered with an outer resin (shell).

FIG. 2 schematically shows the cross section of an electrophotographic toner particle of the invention. In an example of preferable embodiments, as is shown in FIG. 3, the colored particle may be covered by au outer resin (shell). In such the case, combination of the resin constituting the inner portion (core) of the colored particle and the thermoplastic resin (binder resin) is not specifically limited and the degree of selection freedom of the material is made large. When the shell resins of the four color (yellow, magenta, cyan and black) toners are the same, advantage in the cost is large since the toners can be produced under the same production condition. Moreover, anxieties of the sublimation of the dye and contamination of oil, which are generally considered as problems in toners using dye, are not caused since transfer of the dye as the colorant to outside of the colored fine particle (exposing of the dye at the surface of the colored fine particle) is not caused when the colored fine particle is covered by the shell resin.

(Production Method of Colored Fine Particle)

An example of production method of the invention will be described below as one of preferable embodiments.

The colored fine particle can be obtained, for example, by dissolving or dispersing the dye (or the dye, resin, high-boiling solvent and additive) in an organic solvent and emulsifying in water and then removing the solvent; such method is called as the dry-in-liquid method. When the resin is added for overcoating with an outer resin (shell), a monomer having a polymerizable unsaturated double bond is added to the colored fine particle and emulsion polymerization is carried out in the presence of a surfactant to precipitate the resin simultaneously with polymerization. Thus colored fine particle having the core/shell structure can be obtained. Other than that, such colored fine particle can be prepared by various methods such as a method in which an aqueous dispersion of rein fine particles is previously prepared by emulsion polymerization and mixed with an organic solvent solution of the dye for impregnating the dye into the resin fine particle and then the shell is formed on the core of the colored fine particle.

The shell is preferably formed by an organic resin, and a method is applicable in which a resin dissolved in an organic solvent is gradually propped for simultaneously precipitating and adsorbing onto the colored fine particle surface. In the present invention, the method is preferable in which the colored fine particle to be used as the core is formed and then the monomer having a polymerizable unsaturated double bond is added and emulsion polymerization is carried out in the presence of the surfactant for forming the shell by precipitating the resin simultaneously with the polymerization.

Other than the above, the dye may be dispersed in water in the presence of the surfactant by a bead dispersing machine, a high speed stirring dispersing machine or a medium using type stirrer.

(Surfactants)

A usual anionic emulsification agent (surfactant) and/or a nonionic emulsification agent (surfactant) can be used according to necessity on the occasion of emulsification of the colored fine particle as one of preferable embodiments of the invention.

As examples of nonionic surfactant, a polyoxyethylene alkyl ether such as polyoxyethylene lauryl ether and polyoxyethylene stearyl ether, a polyoxyethylene alkylphenyl ether such as polyoxyethylene nonylphenyl ether, a sorbitan higher fatty acid ester such as sorbitan monolaurate, sorbitan monostearate and sorbitan trioleate, a polyoxyethylene higher fatty acid ester such as polyoxyethylene monolaurate and polyoxyethylene monostearate, a glycerol higher fatty acid ester such as oleic monoglyceride and stearic monoglyceride and a polyoxyethylene-polyoxypropylene block copolymer are cited.

As examples of the anionic surfactant, a higher fatty acid salt such as sodium oleate, an alkylarylsulfonate such as sodium dodecylbenzenesulfonate, an alkylsulfate such as sodium laurylsulfate, a polyoxyethylene alkyl ether sulfate such as sodium polyethoxyethylene lauryl ether sulfate, a polyoxyethylene alkylaryl ether sulfate such as sodium polyoxyethylene nonylphenyl ether sulfate, a salt of alkylsulfosuccinic ester salt such as sodium monooctyl-sulfosuccinate, sodium dioctylsulfosuccinate and sodium polyoxyethylene laurylsulfosuccinate and a derivative thereof can be cited.

(Dye)

The dyes to be used in the invention will be described below.

Generally known dyes are usable in this invention, and oil-soluble dyes are preferred and chelate dyes are more preferred. Usually, oil-soluble dyes which do not contain any water-solubilizing group such as a carboxylic acid or sulfonic acid group, are soluble in organic solvents and not soluble in water, but a dye obtained by salt-formation of a water-soluble dye with a long chain base and thereby being soluble in oil, is also included. There are known, for example, an acid dye, a direct dye and a salt formation dye of a reactive dye with a long chain amine.

Specific examples thereof are described below but are not limited to these: Valifast Yellow 4120, Valifast Yellow 3150, Valifast Yellow 3108, Valifast Yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906, Oil Black 5905, which are all available from Orient Kagaku Kogyo Co., Ltd.; Kayaset Yellow SF-G, Kayaset Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312, Kayaset Blue K-FL, which are all available from NIPPON KAYAKU CO., LTD.; FS Yellow 1015, FS Magenta 1404, FS cyan 1522, FS Blue 1504, C.I. Solvent Yellow 88, 83, 82, 79, 56, 29, 16, 14, 04, 03, 02, and 01; C.I. Solvent Red 84:1, C.I. Solvent Red 84, 218, 132, 73, 72, 51, 43, 27, 24, 18, and 01; Solvent Blue 70, 67, 44, 40, 35, 11, 02, and 01; C.I. Solvent Black 43, 70, 34, 29, 27, 22, 7, 3, and 3; C.I. Solvent Violet 3; C.I. Solvent Green 3 and 7; Plast Yellow DY352, Plast Red 8375, which are available from Arimnoto Kagaku Kogyo Co., Ltd.; MS Yellow HD-180, MS Red G. MS Magenta HM-1450H, MS Blue HM-1384, which are available from Mitsui Kagaku Kogyo; ES Red 3001, ES Red 3002, ES Red 3003, TS Red 305, ES Yellow 1001, ES Yellow 1002, Ts Yellow 118, ES Orange 2001, ES Blue 6001, TS Tuyq Blue 618, which are available from SUMITOMO CHEMICAL CO., LTD.; ACROLEX Yellow 6G, Ceres Blue GNNEOPAN Yellow 075, Ceres Blue GN, MACROLEX Red and Violet R, which are available from Bayer Co.

Disperse dyes are also usable as an oil-soluble dye, examples thereof include C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse green 6:1 and 9.

In addition, cyclic methylene compounds derived from phenol, naphthol, pyrazolone and pyrazolotriazole; and azomethine dye and indoaniline dye derived from a coupler such as an open chain methylene compound are also preferably usable.

Preferable dyes as described above include: the dyes described in JP-A Nos. 03-114892, 04-62092, 04-62094, 04-82896, 05-16545, 05-177958 and 05-301470.

(Particle Diameter)

The colored fine particle as one of preferable embodiments of the invention preferably has a volume average particle diameter of from 10 nm to 1 μm. When the volume average particle diameter is less than 10 nm, the effect of sealing the dye in the polymer of the colored fine particle is lowered and the stability of the colored fine particle tends to be degraded and the storage stability is tends to be lowered because the surface area per unit volume of the particle becomes very large. Besides, a large particle having a size exceeding 1 μm is easily precipitated in the course of fine particle production so that the stability in accumulation is lowered. Moreover, decreasing in the glossiness and considerable lowering in the transparency are caused when such the particle is used to make the toner. Accordingly, the average particle diameter of the colored fine particle is preferably from 10 nm to 1 μm, more preferably from 10 to 500 nm, and further preferably from 10 to 100 nm.

The volume average particle diameter can be determined by a dynamic light scattering method, laser diffraction method, centrifugal precipitation method, FFF method or electric sensor method. In the invention, the particle diameter is preferably determined by the dynamic light scattering method using Zetasizer, manufactured by Malvem Ltd.

(Dye Content)

The colored fine particle relating to the invention preferably has a dye content of from 10 to 70 mass %. When the dye content is from 10 to 70 mass %, sufficient density can be obtained and the protection effect of the resin to the dye is realized so that the storage stability of the fine particle dispersion is superior, therefore the increasing in the particle sized caused by coagulation can be prevented.

(Content of Metal-Containing Compound)

The metal-containing compound represented by Formula (1) may be used singly or in combination of two kinds, and the total amount of the metal-containing compounds is preferably from 0.8 to 3 times of moles, and more preferably 1 to 2 times, in mole of a dye. The light fastness is considerably improved when the content is 0.8 times of moles or more, and the dispersion stability of the colored fine particle is raised when the content is 3 times of moles or less so that toner making can be advantageously carried out tough depending on the kind of dye.

(Toner)

In the electrophotographic toner of the invention, a charge controlling agent and an offset preventing agent can be added additionally to the above thermoplastic resin and the colored fine particle. As the charge controlling agent to be used in the color toner, a colorless, white or faint color charge controlling agent which does not give bad influence on the tone and transparency of the toner can be used. For example, complexes of metals such as zinc and chromium with a derivative of salicylic acid, calixarene type compounds, organic boron compounds and fluorine-containing quaternary ammonium salt type compounds are suitably used. For example, the salicylic acid metal complexes described in JP-A Nos. 53-127726 and 62-145255, the calixarene compounds described in JP-A No. 02-201378, the organic boron compounds described in JP-A No. 02-221967 and the organic boron compounds described in JP-A No. 3-1162 are usable. When such the charge controlling agent is used, the content of it is preferably from 0.1 to 10 mass parts, and more preferably from 0.5 to 5.0, mass parts with respect to 100 mass parts of the thermoplastic resin (binder resin).

The offset preventing agent is not specifically limited and polyethylene wax, oxide type polyethylene wax, Carnauba wax, polypropylene wax, oxide type polypropylene wax, Sasol wax, rice wax, candelilla wax, jojoba oil wax and beeswax are usable for example. The adding amount of such the wax is desirably from 0.5 to 30 mass parts, preferably from 1 to 20 mass parts with respect to 100 mass parts of the thermoplastic (binder) resin. The effect of addition is made insufficient when the adding amount is less than 0.5 mass parts, and the transparence and color reproduction ability is lowered when the adding amount is more than 30 mass parts.

As an image stabilizing agent, the compounds described or referred on pages 10 to 13 of JP A H08-29934 may be added and phenol type, amine type, sulfur type and phosphor type compounds available on the market are also cited. An organic and inorganic UV absorbent may be added for the same purpose. As the organic UV absorbent, a benzotriazole compound such as 2-(2'-hydroxy-5-t-butylphenyl)benzotriazole and 2-(2'-hydroxy-3,5-di-t-butylphenyl)benzotriazole, a benzophenone type compound such as 2-hydroxy-4-methoxybenzophenone and 2-hydroxy-4-n-octyloxybenzophenone, and a hydroxybenzoate compound such as phenyl salicylate, 4-t-butylphenyl salicylate, n-hexadecyl 2,5-t-butyl-4-hydroxybenzoate and 2,4-di-t-butylphenyl-3',5'-di-t-butyl-4'-hydroxybenzoate can be cited. As the inorganic UV absorbent, titanium oxide, zinc oxide, cerium oxide, iron oxide and barium sulfate can be cited. The organic UV absorbents are preferable. The UV absorbent preferably has 50% transparent wavelength range of from 350 to 420 nm and more preferably from 360 to 400 nm. The UV cutting ability is insufficient at the wavelength of shorter than 350 nm and the coloring is increased at the wavelength of longer than 420 nm, therefore, such the UV absorbent is not preferable. The adding amount is preferably within the range of from 10 to 200 mass % of the dye is preferable and that from 50 to 150 mass % is more preferable though the adding amount is not specifically limited.

(Binder Resins)

As the binder resin to be contained in the electrophotographic toner of the present invention, it is preferable to be selected from thermoplastic resins having high contacting ability with the colored fine particle or the cupper complex fine particle, which is one of the preferable embodiments of the invention. In particular, a solvent-soluble thermoplastic resin is especially preferred. A curable resin capable of forming a three dimensional structure is usable when the precursor of the resin is solvent-soluble. As the thermoplastic resin, one usually used for toner can be used without any limitation. Examples of the thermoplastic resin include a styrene type resin, an acryl resin such as an alkyl acrylate and alkyl methacrylate, a styrene-acryl type copolymer resin, a polyester type resin, a silicone type resin, an olefin type resin, an amide type resin and an epoxy type resin are suitably used, and the resin having high transparency, low viscosity in melted state and sharp melting property is required for raising the transparency and the color reproducibility of the overlapped image. Styrene type resin, acryl type resin and polyester resin are suitable for the resin having such the properties.

It is preferable to use a resin having the following properties for a binder resin: a number average molecular weight (Mn) of from 3,000 to 6,000, preferably from 3,500 to 5,500, a ratio Mw/Mn of weight average molecular weight Mw to number average molecular weight Mn of from 2 to 6, preferably from 2.5 to 5.5, a glass transition temperature of from 50 to 70° C., preferably from 55 to 70° C., and a softening point of from 90 to 110° C., preferably from 90 to 105° C.

Fixing strength against folding is degraded and damages of the image are caused by peeling off of the toner on the occasion of folding a full color solid image when the number average molecular weight of the binder resin is less than 3,000, and the fixing strength is lowered accompanied with lowering in the thermal melting ability on the occasion of fixing when the number average molecular weight exceeds 6,000. Offset at high temperature is easily caused when Mw/Mn is less than 2, and the sharp melt ability at the time of fixing is lowered and light permeability and color mixing ability on the occasion of full color image formation is degraded when the ratio is more than 6. When the glass transition point is lower than 50° C., the heat resistivity of the toner is made insufficient and coagulation of the toner during storage tends to be caused and when the glass transition point is higher than 70° C., the toner is difficulty melted so that the fixing ability and the color mixing ability on the occasion of full color image formation are lowered. When the softening point is lower than 90° C., high temperature offset is easily caused and when higher than 110° C., fixing strength, light stansmittance, color mixing ability and glossiness of full color image are lowered.

The electrophotographic toner of the invention can be produced by using the above-described thermoplastic resin, colored fine particle and the other desirable additives, the fine particle may be a mixture of several kinds thereof or single kind for each of the particles, and by applying a method such as a knead and pulverizing method, suspension polymerization method, emulsion polymerization method, emulsified dispersion granule forming method, and capsulation method. Among these production methods, the emulsion polymerization method is preferable from the viewpoint of the cost and stability of the production considering the size down of the toner particle accompanied with the improvement of image quality.

By the polymerization method, the toner particle is produced as follows; thermoplastic resin emulsion prepared by emulsion polymerization is mixed with the dispersion of another component of toner particle such as the colored particles and the particles are gradually coagulated while taking balance between the repulsion force of the particle surface and the coagulation force caused by the addition of electrolyte by pH control, and the fusion and shape of the particles is controlled by heating and stirring the system while controlling the diameter and distribution thereof. It is preferable from the viewpoint of high definition reproduction of image to control the volume average diameter of the electrophotographic toner particle to 4 to 10 μm, more preferably to 6 to 9 μm.

In the electrophotographic toner of the invention, a post treatment agent can be added and mixed for providing fluidity and improvement of cleaning suitability. As such the post treatment agent, an inorganic oxide fine particle such as a silica fine particle, an alumina fine particle and a titania fine particle, an inorganic stearic acid compound such as aluminum stearate fine particle and zinc stearate fine particle and an inorganic titanic acid compound fine particle such as strontium titanate and zinc titanate are usable. Such the fine particles may be used singly or in combination with another kind of additive. It is desirable that these fine particles are subjected to surface treatment by a silane coupling agent, titanium coupling agent, higher fatty acid or silicone oil and the adding amount of the fine particle is from 0.05 to 5 mass parts, preferably from 0.1 to 3 mass parts, with respect to 100 mass parts of the toner.

The electrophotographic toner of the invention can be used as the toner of a two-component developer together with a carrier or a one-component developer without carrier.

As the carrier for two-component developer to be combined with the electrophotographic toner of the invention, for example, a carrier composed of a particle of magnetic substance such as iron and ferrite, a resin coated carrier prepared by coating the magnetic particle with a resin and a binder type carrier prepared by dispersing the fine particles of the magnetic substance into a binder resin are usable. Among these carriers, coating resins used for a resin coated carrier are not limited in particular, preferable examples thereof include: an olefin type resin, a styrene type resin, a styrene/acrylic resin, a silicone type resin, a copolymer resin (graft resin) of organopolysiloxane and a vinyl type monomer, a fluorinated type resin and a polyester type resin from the viewpoint of toner spending, and a carrier coated with a resin formed by reacting isocyanate to the copolymer resin of organopolysiloxane and a vinyl type monomer is preferable from the viewpoint of durability, environmental stability and ant-spending property. As the above vinyl type monomer, a monomer having a substituent reactive with isocyanate such as a hydroxyl group is necessarily used. Moreover, as resins used for a binder type carrier, they are not limited in particular, and conventionally known resins can be used. Examples thereof include: a styrene/acrylic resin, a polyester type resin, a fluorinated type resin and a phenol resin. The carrier having a volume average diameter of from 20 to 100 μm, and preferably from 20 to 60 μm is preferably used from the viewpoint of securing high image quality and preventing fog. The volume average particle diameter of the carrier can be determined by a laser diffraction particle size distribution measuring apparatus having a wet type disperser HELOS manufactured by SYMPATEC Gmbh.

(Image Forming Method)

The image forming method with the electrophotographic toner of the present invention will be described.

The types of image forming methods are not limited in the present invention. The image forming method include, for example, a method by forming plural images are formed on the photoreceptor and collectively transferred and a method by successively transferring images formed on the photoreceptor onto an intermediate transfer belt. The method by collectively transferring plural images formed on the photoreceptor is more referable.

In this method, the image formation is carried out as follows. The photoreceptor is uniformly charged and imagewise exposed to light and then firstly developed to form the first toner image on the photoreceptor. Then the photoreceptor having the first image is uniformly charged and imagewise exposed to light corresponding to the second image and secondarily developed to form the second toner image. The photoreceptor having the first and second images is uniformly charged and imagewise exposed to light corresponding to the third image and thirdly developed to form the third toner image. Moreover, the photoreceptor having the first, second and third images is uniformly charged and imagewise exposed to light corresponding to the fourth image and fourthly developed to form the four toner image.

For example, a full color toner image is formed on the photoreceptor by carrying out the first to fourth developments by each using the yellow, magenta, cyan and black toners, respectively. After that, the image formed on the photoreceptor is collectively transferred onto an image support such as paper and fixed to the image support to obtain the image.

In this method, the images formed on the photoreceptor are collectively transferred onto the paper to form the image. Therefore, the image quality can be raised because the transfer causing disturbance of the image is carried out only at once, different from an intermediate transfer method.

As the developing method, a non-contact development is preferred since plural times of development are necessary. A method in which alternative electric field is applied on the occasion of development is also preferable.

As the above-mentioned, the non-contact developing method is preferable in the system in which a piled color image is formed on the photoreceptor and collectively transferred.

Moreover, the following method is used for improvement in the speed. A plurality of photoreceptors and developing apparatus corresponding to each color are provided; the picture images corresponding to each color are formed on the plurality of photoreceptors and they are transferred in piles on an intermediate transfer member one by one; a package transfer is carried out on an image receiving material such as paper, and a full color image is obtained. In this case, a contact developing method can be adopted as a developing mode, and both a one-component developer and a two-component developer can be adopted as a developer. This method is also called a tandem method, and since a monochrome picture and a full color image can be produced at the same printing speed by one light exposure, it is adopted with the high-speed machine.

A heat-contacting method is suitably usable as the fixing method suitably used in the invention. As typical heat-contacting method, a heating roller fixing system and a press and heat fixing system in which fixing is carried out by a rotating roller including a heater can be cited.

(Image)

In the course of image formation by development, transferring and fixing using the electrophotographic toner of the present invention, the colored particle in the electrophotographic toner is not crushed and the state of dispersed in the toner particle is held even when the toner is transferred onto the surface of the paper.

In the invention, the dye is not released or moved on the surface of the toner particle even though the toner particle contains the dye in high concentration by dispersing the colored particles in the toner particle. Therefore, the following problems of the toner prepared by directly dispersing or dissolving the dye into the thermoplastic resin, at the surface of which the dye is exposed, such as that: (1) electric charging amount is low, (2) difference of charging amount at high temperature and high humidity condition and that at low temperature and low humidity condition is large, (3) the electric charging amount is fluctuated depending on the kind of colorant, for example, the electric charging amounts of toners respectively using cyan, magenta, yellow and black pigments for full color image recording are different from each other, can be dissolved. Moreover, problems of the dye sublimation and the oil contaminate on the occasion of the fixing by heat are caused on the toner using an usual dye because the moving of the dye as the colorant to outside of the colored fine particle (exposition of the dye onto the surface of the colored fine particle) is not caused on the occasion of the fixing by heating.

EXAMPLES

The present invention is described in detail bellow by referring to examples. Herein, the expressions "parts" and "%" referred to in the examples are based on "mass", unless otherwise specified.

Synthetic Example 1

<Synthesis of Exemplified Compound 8>

The synthesis of exemplified Compound 8 is shown in the following scheme.

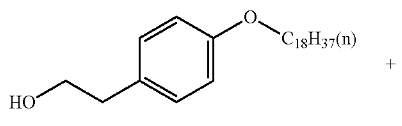

Compound A

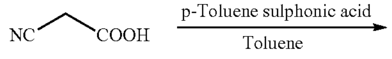

-continued

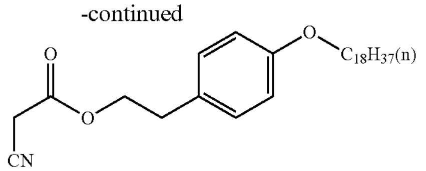

Compound B

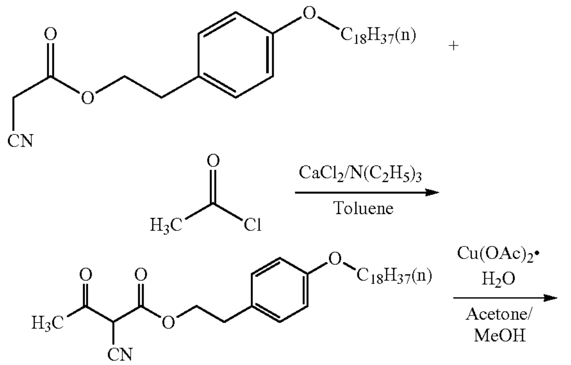

Compound C

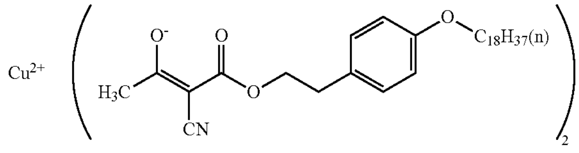

Exemplified Compound 8

(Synthesis of Compound B)

In a 500 ml three-necked flask were placed 90 g of compound A, 21.5 g of cyano acetic acid, 1.31 g of p-toluene sulphonic acid hydrate and 300 ml of toluene. The resulting mixture was heated to reflux for 2 hours so as to achieve dehydration using an esterification device. After removing the solvent under a reduced pressure, 500 ml of acetone was added to the residue to recrystallize the product. Thus 94.4 g of compound B was prepared.

(Synthesis of Compound C)

In a 100 ml three-necked flask were placed 5 g of compound B, 25 ml of toluene, 3.3 g of triethyl amine and 2.42 g of calcium chloride. The resulting mixture was heated to 80° C. with stirring. After the inner temperature was attained to 80° C., 2.1 g of acetyl chloride was added dropwise over 1 hour. After completing the drop, the mixture was cooled, then added diluted hydrochloric acid to separate the solution. After washing the solution with pure water to attain the pH of the solution to neutral, the solvent was removed. The residue were recrystallized by adding 50 ml of toluene and 50 ml of ethyl acetate to obtain 4.3 g of compound C. The NMR spectrum of compound C:

$^1H$ NMR, $CDCl_3$; δ=0.88 (t, 3H), δ=1.20-1.28 (m, 28H), δ=1.42 (m, 2H), δ=1.76 (m, 2H), δ=2.13 (s, 3H), δ=3.01 (t, 2H), δ=3.93 (t, 2H), δ=4.48 (t, 2H), δ=6.87 (d, 2H), δ=7.19 (d, 2H) and δ=14.17 (s, 1H).

(Synthesis of Exemplified Compound 8)

In a 200 ml three-necked flask were placed 2 g of compound C and 80 ml of acetone. The resulting mixture was heated with stirring until the inner temperature became to 55° C. Then to the mixture was added dropwise a solution of 0.55 g of copper acetate mono hydrate dissolved in 5 ml of mixed solvent of methanol and water (mixing ration of 5 to 1) over 30 minutes. After completion of the drop, the precipitated solid was filtered to obtain 1.4 g of exemplified compound 8 (melting point: 146-147° C.)

An infra-red spectrum of exemplified Compound 8 is shown in FIG. 1.

Synthetic Example 2

<Synthesis of Exemplified Compound 35>

The synthesis of exemplified Compound 8 is shown in the following scheme.

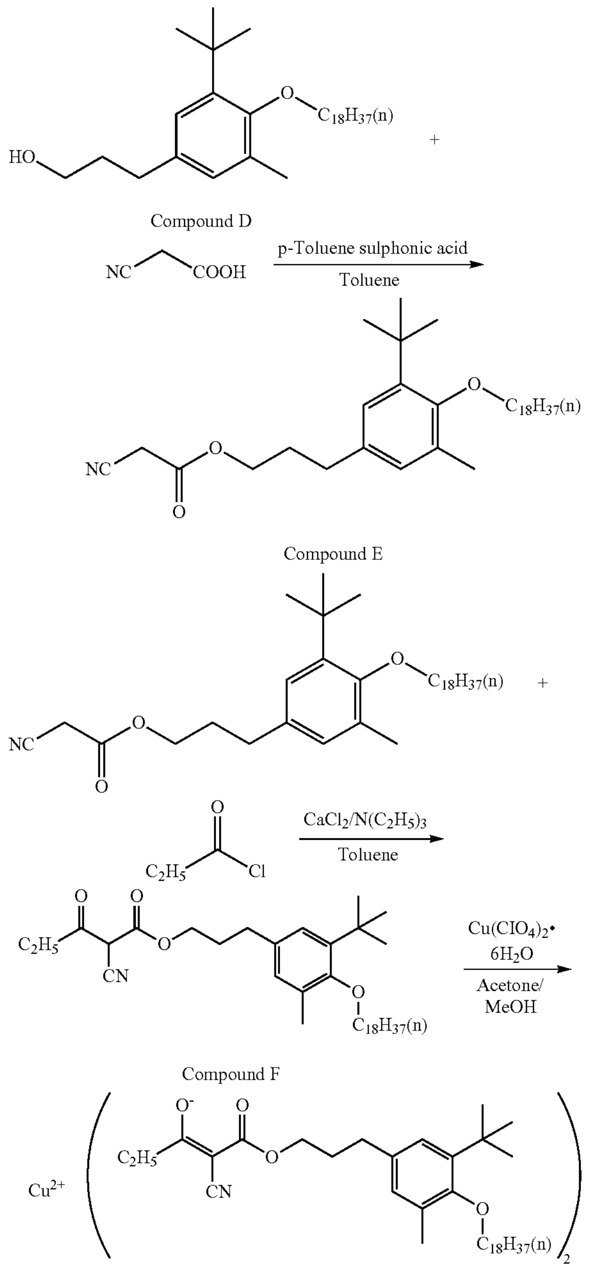

Compound D

Compound E

Compound F

Exemplified Compound 35

(Synthesis of Compound E)

In a 300 ml three-necked flask were placed 36.11 g of compound D, 7.8 g of cyano acetic acid, 1.6 g of p-toluene sulphonic acid hydrate and 180 ml of toluene. The resulting mixture was heated to reflux for 2 hours so as to achieve dehydration using an esterification device. After completing the dehydration, the mixture was cooled, then added diluted hydrochloric acid to separate the solution. After washing the solution with pure water to attain the pH of the solution to neutral, the solvent was removed under a reduced pressure to obtain 41.18 g of crude compound E.

(Synthesis of Compound F)

In a 500 ml three-necked flask were placed 20 g of compound E, 200 ml of toluene, 11.1 g of triethyl amine and 8.2 g of calcium chloride. The resulting mixture was cooled to 8° C. with stirring. After the inner temperature was attained to 8° C., 3.8 g of propionyl chloride was added dropwise over minutes. After completing the drop, the mixture was separated by adding 100 ml of pure water with repeating three times. The separated organic phase was subjected to a reduced pressure to obtain a residue. The obtained residue was purified with a column chromatography using a eluent of a mixture of toluene and ethyl acetate. Thus 20.15 g of compound F was obtained. The NMR spectrum of compound C: $^1H$ NMR, $CDCl_3$; δ=0.9-1.1 (m, 6H), δ=1.20-1.28 (m, 28H), δ=1.44 (m, 2H), δ=1.57 (s, 9H), δ=1.81 (m, 2H), δ=2.10 (m, 2H), δ=2.28 (s, 3H), δ=2.45-2.67 (m, 4H), δ=3.79 (m, 2H), δ=4.37 (m, 2H), δ=8.05-8.18 (dd, 2H) and 6=14.23 (s, 1H).

(Synthesis of Exemplified Compound 35)

In a 50 ml three-necked flask were placed 2 g of compound F and 20 ml of acetone. The resulting mixture was heated with stirring until the inner temperature became to 55° C. Then to the mixture was added dropwise a solution of 0.45 g of copper acetate mono hydrate dissolved in 5 ml of mixed solvent of methanol and water (mixing ration of 1 to 1) over 30 minutes. After completion of the drop, the mixture was cooled with ice, and the precipitated solid was filtered to obtain 1.6 g of exemplified compound 35 (melting point: 48-61° C.)

Synthetic Example 3

<Synthesis of Exemplified Compound 37>

The synthesis of exemplified Compound 37 is shown in the following scheme.

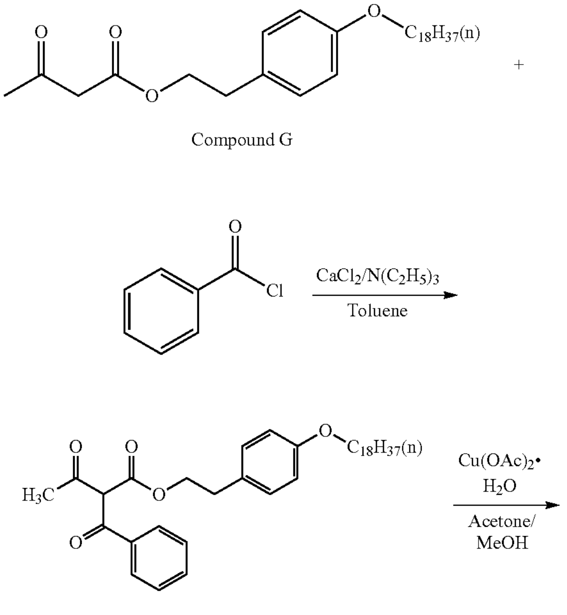

Compound G

Compound H

-continued

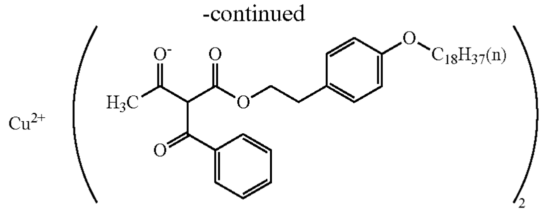

Exemplified Compound 37

(Synthesis of Compound H)

Compound H was synthesized in the same manner as the process of Synthetic Example 1, except that compound B and acetyl chloride described in Synthetic Example 1 was respectively changed to compound G and benzoyl chloride. The NMR spectrum of compound H: $^1$H NMR, $CDCl_3$; δ=0.88 (t, 3H), δ=1.20-1.28 (m, 28H), δ=1.42 (m, 2H), δ=1.76 (m, 2H), δ=2.13 (s, 3H), 6=3.01 (t, 2H), δ=3.93 (t, 2H), δ=4.48 (t, 2H), δ=6.87 (d, 2H), δ=7.19 (d, 2H), δ=7.5-7.6 (m, 3H), δ=7.9-8.0 (dd, 2H) and 8=14.17 (s, 1H).

(Synthesis of Exemplified Compound 37)

Exemplified Compound 37 was synthesized in the same manner as the process of Synthetic Example 1, except that compound C described in Synthetic Example 1 was changed to compound H.

The other compound of the present invention can be synthesized in the same manner as describe above.

<Synthesis of Comparative Compounds 1 and 2>

Comparative compounds 1 and 2 shown below were synthesized in the same manner as the process of Synthetic Example 1.

Comparative Compound 1

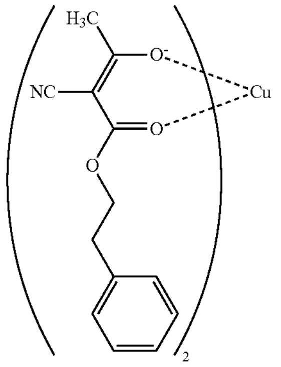

Comparative Compound 2

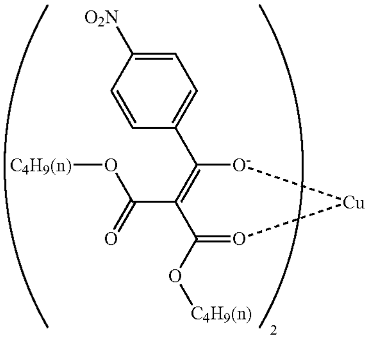

Example 1

A toner was prepared using the following production method.

(Preparation of Color Toner)

<Preparation of Colorant Dispersion Liquid>

To a solution of 4.9 g of sodium dodecyl sulfate dissolved in 200 ml of pure water was added 23 g of a mixture of a colorant and a metal-containing compound (molar ratio: 1:1.05) shown in Table 1. Then, the mixed composition was stirred and subjected to an ultra-sonic treatment to prepare an aqueous dispersion liquid of a magenta colorant. Separately, there was prepared an emulsified dispersion liquid having a solid density of 32% by emulsifying low molecular weight polypropylene (number average molecular weight: 3,400) in water by the aid a surfactant with heating.

<Preparation of Color Toner>

To the above-described colorant dispersion liquid was added 63 g of the emulsified dispersion of low molecular weight polypropylene. Further, there were added 225 g of styrene, 40 g of butyl acrylate, 11 g of methacrylic acid, 5.3 g of t-dodecyl mercaptan as a chain transfer agent and 2,000 ml of degassed pure water. Then, the mixture was stirred under a nitrogen flow and kept at 70° C. for 3.5 hours to carry out emulsion polymerization.

To 1,000 ml of the prepared colorant-containing resin particle dispersion liquid was added sodium hydroxide so as to adjust the pH value to be 7.0. Then, 270 ml of aqueous 2.7 mol/L potassium hydroxide solution was added. Further, there was added a solution of 160 ml of i-propyl alcohol and 9.0 g of polyoxyethylene octyl phenyl ether having an average polymerization degree of ethylene oxide of 10 dissolved in 67 ml of pure water. The mixture was stirred to react while keeping at 77° C. for 5.5 hours. The obtained reaction mixture was filtered and washed with water, and the product was dried and pulverized to obtain colored particles.

The prepared colored particles and 1.0 part of silica particles R805 (mentioned previously) were mixed with a Henschel mixer to obtain a polymerization color toner.

<Preparation of Carrier>

Into a high-speed stirring mixer were placed 40 g of styrene/methyl methacrylate (4/6) copolymer particles (average particle size of 80 nm) and 1,960 g of Cu—Zn ferrite particles (specific gravity: 5.0; weight average particle size: 45 μm; saturated magnetization when applied an outer magnetic filed of 1,000 Oersted: 62 emu/g). The composition was mixed at 30° C. for 15 minutes.

Then, the temperature was set to be 105° C. and mechanical impact was repeatedly given for 30 minutes, followed by cooling to obtain a carrier.

<Preparation of Developer for Image Formation Test>

214 g of the above-produced carrier and 16 g of each toner were mixed for 20 minutes using a V-type mixer. Thus Developers 1 to 25 for image formation test and Comparative developers 26 to 29 were prepared. The prepared developer compositions are shown in Table 1.

<Image Formation>

Evaluation of image formation was done using a color copier (KL-2010: made by Konica Minolta Business Technologies, Inc.) as an image forming apparatus.

As a fixing device, a usually employed heating roller type fixing device was used. Concretely, a heating roller was constituted by coating the surface of a cylindrical metal core (inner diameter: 40 mm, wall thickness: 1.0 mm, entire width: 310 mm) including a heater at the center portion thereof and covered by a layer of tetrafluoroethylene perfluoroalkyl vinyl ether copolymer (PFA) having a thickness of 120 μm, and a pressing roller was constituted by covering a cylindrical metal core (inner diameter: 40 mm, wall thickness: 2.0 mm) by silicone rubber sponge (Asker C hardness: 48; thickness: 2 mm). The aforesaid heating roller and pressing roller were contacted with each other by a pressure of 150 N to form a nip of 5.8 mm width.

The line speed of printing was set at 400 mm/sec using the above fixing device. For cleaning the fixing device, a supplying system using a web impregnated with polydiphenyl silicone (having a viscosity of 10 Pa·s at 20° C.) was used. The fixing temperature was controlled according to the surface temperature of the heating roller set at 176° C. The coating amount of the silicone oil was 0.1 mg/A4.

<Evaluation>

By using a toner set containing color toners of the present invention, each reflective image (image on a paper) was produced on a paper with the above-described image forming apparatus. The image was evaluated with the following methods. The evaluation was carried out with an adhering toner amount in the range of 0.65±0.05 mg/cm$^2$.

(Evaluation of Hue)

With respect to the hue, the formed image was visually evaluated by 10 monitors with maximum points of 10. An average point of the 10 monitors was ranked as below.

A: from 9 to 10 points

B: from 8 to 9 points

C: from 7 to 8 points

D: less than 7 points

<Lightfastness>

The image density just after recording $D_0$ was measured and then the image density D was measured again after subjected to exposure test with “Xenon Long Life Weather Meter” (xenon ark lamp: 70,000 lux) at 24° C. for 6 days. The dye remaining ratio was calculated from the difference of the densities each measured before and after the light exposure.

A: The dye remaining ratio was 80% or more.

B: The dye remaining ratio was from 70% to 80%.

C: The dye remaining ratio was from 60% to 70%.

D: The dye remaining ratio was less than 60%.

(The rankings of A and B are considered to be acceptable for practical use.)

(Moisture Dependence of Electric Charging Property)

The moisture dependence of electric charging property is evaluated as follows. A magenta developing device is loaded in a mono-unit driving device to drive a magenta developing device of a commercially available digital color copier (multifunctional peripheral) “bizhub C352” (made by Konica Minolta Business Technologies, Inc.). The developer was adjusted to have the ratio of the toner of the present invention to the carrier mixed therewith to become 6%.

Two units of developing devices were left at 20° C. and 50% RH for 144 hours, then two of them each were stored under the following conditions (1) and (2) respectively.

(1) Transferred in an atmosphere of 35° C. and 80% RH, and left for 3 hours.

(2) Transferred in an atmosphere of 12° C. and 12% RH, and left for 3 hours.

The developing devices each subjected to conditions (1) or (2) were driven for 30 seconds and 1,200 seconds. 5 g of each developing devices was sampled at these moments. The electric charging amount was measured with a conventionally known blowoff method.

A: Both values at 30 seconds and 1,200 seconds after subjected to the condition (2) and the condition (1) were less than 3 μC/g.

B: Both values at 30 seconds and 1,200 seconds after subjected to the condition (2) and the condition (1) were more than 3 μC/g and less than 5 μC/g.

C: Both values at 30 seconds and 1,200 seconds after subjected to the condition (2) and the condition (1) were more than 7 μC/g.

(Electric Charging Speed)

There were produced 1,000 sheets of prints each having a pixel ratio of 75% in a condition of much toner consuming amount and much toner replenishing amount. The degree of the toner overflow in the image forming apparatus and brush-stroke of the printed image were visually evaluated.

A: There were observed no toner overflow caused by the defect of electric charging, and no brush-stroke of the printed image.

B: There were observed no toner overflow caused by the defect of electric charging, but observed a slight brush-stroke at the rear edge of the printed.

C: There were observed toner overflow caused by the defect of electric charging, and also observed brush-stroke of the printed image to a degree of being unacceptable for practical use.

(Evaluation of White Spots)

To a digital color copier “CF-3102: two-component developing method) was set each of the developer described in Table 1. There were printed 1,000 sheets of image each having CW ratio of 5% for each color (red (R), green (G), blue (B), black (Bk), cyan (C9, magenta (M), and yellow (Y): total 35%). Then, the color copier was kept under the laboratory condition (23° C. and 55% RH), and then, under the high temperature and high humidity (HH) condition (30° C. and 85% RH) which was severe to the machine for 24 hours. Then an image sample was produced to evaluate white spots property (transferring property). Under the evaluation condition of high temperature and high humidity, since the aggregation force between the toner particles becomes strong and electric charge amount becomes decreased, white spots property will de deteriorated.

A: No white spots were observed on the image

B: A slight amount of white spots was observed on the image, but it was not attained to an image defect level, and the degree of appeared white spots was acceptable for practical use.

C: Many white spots were observed on the image, and there appeared a partial image defect. The degree of appeared white spots was unacceptable for practical use.

The evaluation results are shown in Table 1.

TABLE 1

| Developer No. | Metal-containing compound No. | Colorant | Hue | Lightfastness | Moisture dependence of Electric charging property | Electric charging speed | White spots on the image | Remarks |
|---|---|---|---|---|---|---|---|---|
| 1 | 1 | Y-28 | B | B | B | A | B | Inv. |
| 2 | 1 | C-27 | B | B | A | B | A | Inv. |
| 3 | 1 | M-44 | B | B | A | B | B | Inv. |
| 4 | 2 | C-27 | A | B | A | B | B | Inv. |
| 5 | 8 | Y-28 | A | A | A | A | A | Inv. |
| 6 | 8 | C-27 | A | A | A | A | A | Inv. |

TABLE 1-continued

| Developer No. | Metal-containing compound No. | Colorant | Hue | Lightfastness | Moisture dependence of Electric charging property | Electric charging speed | White spots on the image | Remarks |
|---|---|---|---|---|---|---|---|---|
| 7 | 8 | M-44 | A | A | A | A | A | Inv. |
| 8 | 12 | C-27 | A | A | A | A | B | Inv. |
| 9 | 12 | M-44 | A | A | A | A | A | Inv. |
| 10 | 12 | Y-28 | A | A | A | B | A | Inv. |
| 11 | 13 | Y-28 | A | A | A | A | A | Inv. |
| 12 | 13 | M-44 | A | A | A | A | A | Inv. |
| 13 | 13 | C-27 | A | A | A | A | A | Inv. |
| 14 | 27 | Y-28 | A | B | B | A | A | Inv. |
| 15 | 27 | M-44 | A | A | B | B | B | Inv. |
| 16 | 27 | C-27 | A | B | B | B | A | Inv. |
| 17 | 34 | M-44 | B | B | B | B | A | Inv. |
| 18 | 35 | M-44 | A | A | A | B | A | Inv. |
| 19 | 37 | C-27 | B | B | B | A | A | Inv. |
| 20 | 39 | M-44 | A | B | B | B | B | Inv. |
| 21 | 18 | M-44 | B | A | B | B | A | Inv. |
| 22 | 25 | M-44 | B | B | B | A | A | Inv. |
| 23 | 36 | Y-28 | A | B | B | B | B | Inv. |
| 24 | 26 | Y-28 | B | A | B | B | A | Inv. |
| 25 | 38 | C-27 | A | B | A | B | A | Inv. |
| 26 | Comparative compound 1 | M-44 | B | B | C | B | C | Comp. |
| 27 | None | M-44 | D | D | C | B | C | Comp. |
| 28 | Comparative compound 2 | C-27 | B | B | B | C | C | Comp. |
| 29 | None | Y-28 | C | D | B | B | C | Comp. |

Inv.: Present invention,
Comp.: Comparison

As a result, there was observed a stain caused by white spots on the heating roller when an image was produced with comparative developers 26 to 29. On the other hand, all of the images produced by developers 1 to 25 of the present invention did not produce a stain on the heating roller. Further, as is clearly shown by Table 1, by using the color toner of the present invention, it was possible to provide an image exhibiting good storage stability since the produced image showed excellent lightfastness. And further, the electric charging property was improved since the water fastness of the toner was improved, and production of white spots on the image was also improved.

DESCRIPTION OF SYMBOLS

1: Toner particle
2: Thermoplastic resin
3: Colored particle
4: Resin
5: Oil-soluble dye
6: Inner portion (core)
7: Outer resin (shell)

The invention claimed is:

1. An electrophotographic toner comprising at least one metal-containing compound represented by Formula (1):

Formula (1)

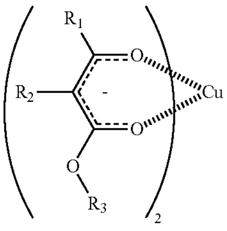

wherein, $R_1$ represents an alkyl group which is selected from the group consisting of a methyl group, an ethyl group, a propyl group, an isopropyl group, a tert-butyl group, a pentyl group, a hexyl group, an octyl group, a dodecyl group, a tridecyl group, a tetradecyl group, a pentadecyl group, a cyclopentyl group and a cyclohexyl group; $R_2$ represents a hydrogen atom, an alkoxycarbonyl group, an aryloxycarbonyl group, a sulfamoyl group, a sulfinyl group, an alkylsulfonyl group, an arylsulfonyl group, an acyl group, a halogen atom, or a cyano group; and $R_3$ represents a group of 9 or more carbon atoms and having an aromatic hydrocarbon structure.

2. A metal-containing compound represented by Formula

Formula (1)

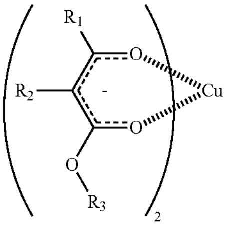

(1):

wherein, $R_1$ represents an alkyl group which is selected from the group consisting of a methyl group, an ethyl group, a propyl group, an isopropyl group, a tert-butyl group, a pentyl group, a hexyl group, an octyl group , a dodecyl group, a tridecyl group, a tetradecyl group, a pentadecyl group, a cyclopentyl group and a cyclohexyl group; $R_2$ represents a hydrogen atom, an alkoxycarbonyl group, an aryloxycarbonyl group, a sulfamoyl group, a sulfinyl group, an alkylsulfonyl group, an arylsulfonyl group, an acyl group, a halogen atom, or a cyano group; and $R_3$ represents a group of 9 or more carbon atoms and having an aromatic hydrocarbon structure.

* * * * *